United States Patent
Krishnaswamy et al.

(10) Patent No.: US 12,547,995 B2
(45) Date of Patent: Feb. 10, 2026

(54) SYSTEM AND METHOD FOR SECURE AND TRACEABLE FUND TRANSFER OPERATION THROUGH A DISTRIBUTED LEDGER

(71) Applicant: JIO PLATFORMS LIMITED, Ahmedabad (IN)

(72) Inventors: Dilip Krishnaswamy, Bangalore (IN); Aayush Bhatnagar, Navi Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 248 days.

(21) Appl. No.: 18/028,548

(22) PCT Filed: Mar. 29, 2022

(86) PCT No.: PCT/IB2022/052866
§ 371 (c)(1),
(2) Date: Mar. 26, 2023

(87) PCT Pub. No.: WO2022/208330
PCT Pub. Date: Oct. 6, 2022

(65) Prior Publication Data
US 2023/0360007 A1 Nov. 9, 2023

(30) Foreign Application Priority Data
Mar. 31, 2021 (IN) .............................. 202121014783

(51) Int. Cl.
*G06Q 20/10* (2012.01)
*G06Q 20/06* (2012.01)
*G06Q 20/38* (2012.01)
*H04L 9/32* (2006.01)

(52) U.S. Cl.
CPC .......... *G06Q 20/10* (2013.01); *G06Q 20/065* (2013.01); *G06Q 20/381* (2013.01);
(Continued)

(58) Field of Classification Search
CPC ........ G06Q 20/00–425; H04L 9/00–50; H04L 2209/00–88
See application file for complete search history.

(56) References Cited

U.S. PATENT DOCUMENTS 10,055,715 B1 * 8/2018 Grassadonia .......... G06Q 20/36
11,488,165 B1 * 11/2022 Adam ................. G06Q 20/3263
(Continued)

FOREIGN PATENT DOCUMENTS

| EP | 3794491 A1 | 3/2021 |
|---|---|---|
| WO | 2020092446 A2 | 5/2020 |
| WO | 2021044185 A1 | 3/2021 |

OTHER PUBLICATIONS

International Search Report, PCT/IB2022/052866, mailed Jul. 15, 2022, Total pp. 04.

*Primary Examiner* — Chenyuh Kuo
(74) *Attorney, Agent, or Firm* — FINNEGAN, HENDERSON, FARABOW, GARRETT & DUNNER, LLP

(57) ABSTRACT

The present disclosure generally relates to fund transfer/financial transactions, more particularly to system and method for secure and traceable fund transfer operation through a distributed ledger. The system receives, from sender or receiver of user device, keyword-based query to determine first user public key or second user public key. System triggers user device of sender, to sign off amount to be transferred to determined first user public key of receiver, and transmits signed-off amount to blockchain network. The system receives from blockchain network, validation of transfer request, and invokes check and debit smart contract microservice, to check balance and debit in the TSDCB account of sender. The system invokes transfer smart contract microservice to credit the debited amount to TSDCB account of receiver, and identify, TSDCB Account Identities (Continued)

(TA-IDs) for sender and receiver. The system records the transaction in a ledger associated with the blockchain network.

14 Claims, 18 Drawing Sheets

(52) U.S. Cl.
CPC ..... *G06Q 20/3825* (2013.01); *G06Q 20/3829* (2013.01); *G06Q 20/389* (2013.01); *H04L 9/3247* (2013.01); *H04L 2209/56* (2013.01)

(56) References Cited

U.S. PATENT DOCUMENTS

| | | | |
|---|---|---|---|
| 11,909,890 B2* | 2/2024 | Landman | H04L 9/3247 |
| 2011/0246765 A1* | 10/2011 | Schibuk | H04L 63/102 |
| | | | 713/158 |
| 2013/0024358 A1* | 1/2013 | Choudhuri | G06Q 20/4016 |
| | | | 705/38 |
| 2015/0222435 A1* | 8/2015 | Lea | H04L 63/0823 |
| | | | 713/155 |
| 2018/0330342 A1 | 11/2018 | Prakash et al. | |
| 2019/0361917 A1* | 11/2019 | Tran | H04W 12/108 |
| 2020/0027162 A1 | 1/2020 | Singh et al. | |
| 2020/0389306 A1 | 12/2020 | Dolan et al. | |
| 2021/0083872 A1 | 3/2021 | Desmarais et al. | |
| 2021/0194703 A1* | 6/2021 | Queralt | H04L 63/0815 |
| 2022/0067711 A1* | 3/2022 | Huang | H04L 9/3247 |
| 2022/0188924 A1 | 6/2022 | Smith et al. | |

\* cited by examiner

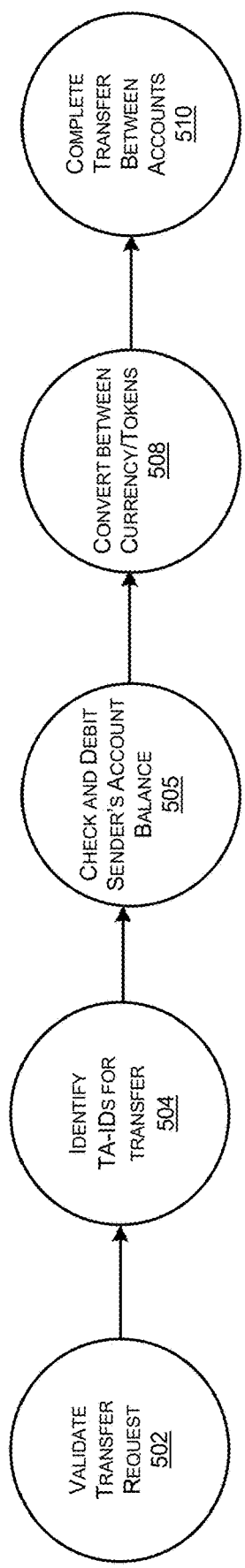
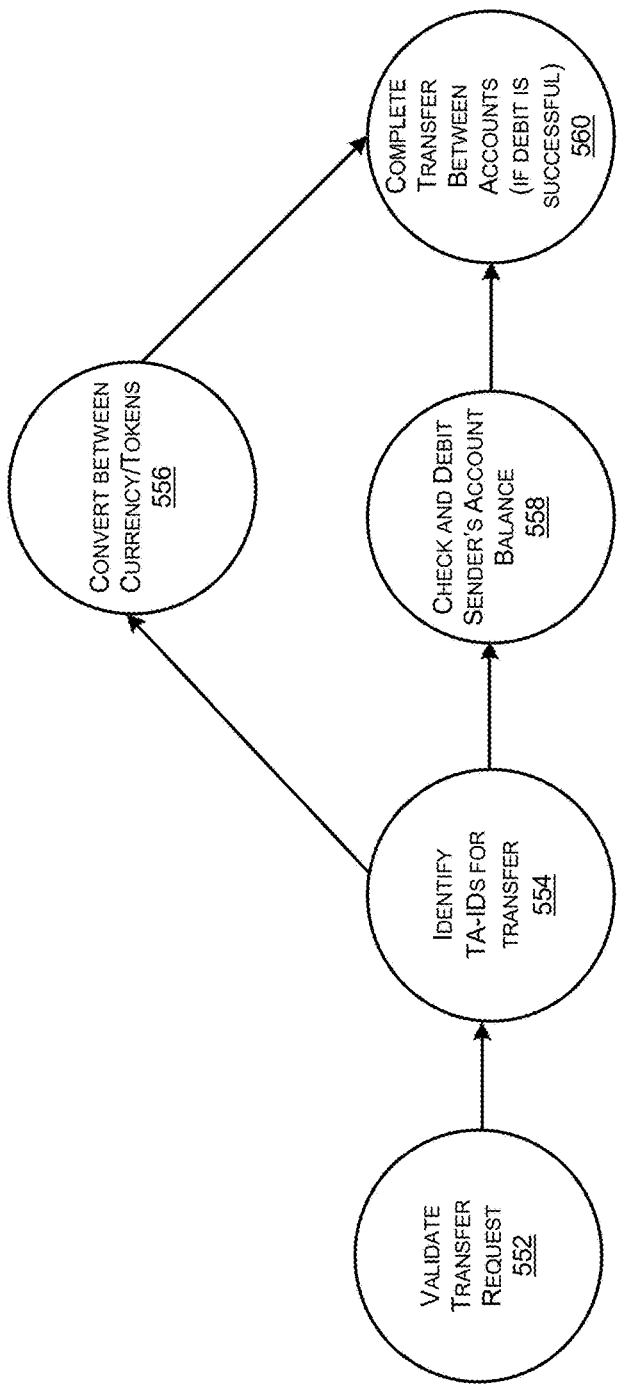
FIG. 5A
FIG. 5B

SYSTEM AND METHOD FOR SECURE AND TRACEABLE FUND TRANSFER OPERATION THROUGH A DISTRIBUTED LEDGER

CROSS-REFERENCE TO RELATED APPLICATION(S)

This application is a National Stage of International Application No. PCT/IB2022/052866, filed on Mar. 29, 2022, which claims priority to Indian Patent Application No. 202121014783, filed Mar. 31, 2021, the disclosures of which are hereby incorporated by reference in their entirety.

RESERVATION OF RIGHTS

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The embodiments of the present disclosure generally relate to fund transfer/financial transactions. More particularly, the present disclosure relates to a system and a method for secure and traceable fund transfer operation through a distributed ledger.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In general, fund transfer operations pertaining to digital currencies such as cryptocurrencies seem to have created a significant hype, however, deployment of such currencies seems to be restricted by regulators due to the inability to trace transactions leading to possible illegal activities that leverage the cryptocurrencies, thereby causing a possible ban or restrictions on such currencies. One of the key issues with cryptocurrencies may be due to the use of public-key/private-key pairs that do not allow the regulating authorities to trace the actual participants of a cryptocurrency-based financial transaction. Also, using a cryptocurrency that leverages asymmetric cryptography (public-private key pairs), one can easily verify that an owner of a digital asset is owned by checking the owner of the private key corresponding to the asset, however, it may be practically impractical to prove that no one else has access to the asset. Thus, the main problems may include lack of traceable nature of user identities of such transactions and the lack of assurance that no one has access to a specific digital financial asset to avoid double-spending. Cryptocurrencies like Bitcoin may be tracked based on the Unspent Transactions (UTXO) model such that issued cryptocurrency units are tracked independently, wherein amounts associated with the output of a completed transaction are marked as UTXOs, whereas the amounts associated with the inputs are marked as completely spent. Typically, each bitcoin transaction may have two outputs, one output to the intended recipient, and the other output is the remaining 'change' that is returned to the sender. Although The UTXO model was designed to avoid double-spending, however, as the number of available UTXOs in such a cryptocurrency system grows over time, it can become more difficult to manage or track. Also, from a regulatory standpoint, the UTXO model may not enable tracking or identifying a user associated with a transaction, thus making the transaction very difficult to trace.

Further, globally distributed blockchain networks may also suffer from scalability issues with very low Transactions Per Second (TPS) support that limits the ability of such networks to support financial transactions at a global scale. In addition to scalability, transparency, and traceability, it may also be important to enhance the security of fund transfer, while allowing good flexibility to the user to transfer funds, both locally and globally, by enabling access to different types of currencies using a single interface and/or account. Although wallet-based systems have been popular for inter-wallet fund transfers using a User Payment Interface (UPI), however, such systems may have witnessed an evident rise in fraud. A fraudster may submit a collection request and ask the account owner to enter the UPI PIN or an OTP pin to allow the collection request to proceed. Also, such wallet systems are directly linked to personal bank accounts for ease of usage, which presents an inherent risk, as they expose money stored in such personal bank accounts.

Therefore, there is a need in the art to provide a robust, reliable, and efficient system and method for secure and traceable fund transfer operation through a distributed ledger, which includes improved flexibility, user experience, scalability, personalization, while providing better transparency of fund transfer so that audit or monitoring bodies can trace the fund transfer operations to prevent illicit operations.

OBJECTS OF THE PRESENT DISCLOSURE

Some of the objects of the present disclosure, which at least one embodiment herein satisfies, are as listed herein below.

In a general aspect, the present disclosure provides a system and a method for secure and traceable fund transfer operation through a distributed ledger.

It is an object of the present disclosure to provide a system and a method to facilitate a secure and traceable fund transfer or interchange between various types of currencies and for enabling scalability for global operations.

It is an object of the present disclosure to provide a system and a method to facilitate better transparency of fund transfer so that audit or monitoring bodies can trace the fund transfer operations to prevent illicit operations, while providing better scope to adapt digital currencies that may not be allowed conventionally due to concerns related to an inability of tracing user/entity identity pertaining to transactions.

It is an object of the present disclosure to provide a system and a method to facilitate enhanced user experience, personalization of fund transfer with respect to user identity, and improved flexibility of operations.

It is an object of the present disclosure to provide a system and a method to facilitate fund transfer between real-world entities, between real and virtual world entities, or between virtual world entities.

SUMMARY

This section is provided to introduce certain objects and aspects of the present invention in a simplified form that are further described below in the detailed description. This summary is not intended to identify the key features or the scope of the claimed subject matter.

In an aspect, the present disclosure provides a system for secure and traceable fund transfer operation through a distributed ledger. The system receives, from at least one of a sender and a receiver associated with a user device, a keyword-based query to determine at least one of a first user public key associated with the receiver and a second user public key associated with a sender. At least one of the sender and the receiver is associated with a Traceable Secure Digital Currency Blockchain (TSDCB) account. Further, the system triggers the user device associated with the sender, to sign off an amount to be transferred to the determined first user public key associated with the receiver of the TSDCB account. The sign-off is performed by the sender using a private key corresponding to the TSDCB account associated with the sender. Furthermore, the system transmits the signed-off amount received from the user device associated with the sender, to a blockchain network. The signed-off amount is received via a fund transfer request to the associated TSDCB account with a digital signature attached to a transaction. Thereafter, the system receives from the blockchain network, a validation of the transfer request, based on validating the digital signature of the second user public key associated with the sender. Also, the system invokes a check and debit smart contract microservice, to check balance and debit in the TSDCB account associated with the sender, for transferring the signed-off amount to the receiver. Further, the system determines, if the TSDCB account associated with the sender and the TSDCB account associated with the receiver comprises different currencies or a digital TSDCB coin or a digital TSDCB token. Thereafter, the system invokes a conversion smart contract microservice for the currency conversion, before the transfer of the signed-off amount, when the TSDCB account associated with the sender and the TSDCB account associated with the receiver comprises different currencies or a digital TSDCB coin or a digital TSDCB token. Further, the system invokes a transfer smart contract microservice to credit the debited amount to the TSDCB account associated with the receiver, upon completion of the debit in the TSDCB account associated with the sender. Furthermore, the system identifies one or more TSDCB Account Identities (TA-IDs) for the sender and the receiver, upon completion of the transfer of the signed-off amount to the receiver. Thereafter, the system records the transaction in a ledger associated with the blockchain network. The record comprises the first user public key associated with the receiver and the second user public key associated with the sender, and the signed-off amount from the sender to the receiver.

In another aspect, the present disclosure further provides a method for secure and traceable fund transfer operation through a distributed ledger. The method includes receiving, from at least one of a sender and a receiver associated with a user device, a keyword-based query to determine at least one of a first user public key associated with the receiver and a second user public key associated with a sender. At least one of the sender and the receiver is associated with a Traceable Secure Digital Currency Blockchain (TSDCB) account. Further, the method includes triggering to the user device associated with the sender, to sign off an amount to be transferred to the determined first user public key associated with the receiver of the TSDCB account. The sign-off is performed by the sender using a private key corresponding to the TSDCB account associated with the sender. Furthermore, the method includes transmitting the signed-off amount received from the user device associated with the sender, to a blockchain network. The signed-off amount is received via a fund transfer request to the associated TSDCB account with a digital signature attached to a transaction. Also, the method includes receiving from the blockchain network, a validation of the transfer request, based on validating the digital signature of the second user public key associated with the sender. Also, the method includes invoking a check and debit smart contract microservice, to check balance and debit in the TSDCB account associated with the sender, for transferring the signed-off amount to the receiver. Thereafter, the method includes determining, if the TSDCB account associated with the sender and the TSDCB account associated with the receiver comprises different currencies or a digital TSDCB coin or a digital TSDCB token. Further, the method includes invoking a conversion smart contract microservice for the currency conversion, before the transfer of the signed-off amount, when the TSDCB account associated with the sender and the TSDCB account associated with the receiver comprises different currencies or a digital TSDCB coin or a digital TSDCB token. Furthermore, the method includes invoking a transfer smart contract microservice to credit the debited amount to the TSDCB account associated with the receiver, upon completion of the debit in the TSDCB account associated with the sender. Thereafter, the method includes identifying, one or more TSDCB Account Identities (TA-IDs) for the sender and the receiver, upon completion of the transfer of the signed-off amount to the receiver. Also, the method includes recording the transaction in a ledger associated with the blockchain network. The record comprises the first user public key associated with the receiver and the second user public key associated with the sender, and the signed-off amount from the sender to the receiver.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that the invention of such drawings includes the invention of electrical components, electronic components or circuitry commonly used to implement such components.

FIG. 5A illustrates an exemplary flow diagram representation of a TSDCB based microservice service-chain for the account transfer, in accordance with embodiments of the present disclosure.

FIG. 5B illustrates an exemplary flow diagram representation of parallel operation related to currency/token conversion microservice of FIG. 5A, in accordance with embodiments of the present disclosure.

Figure 1:
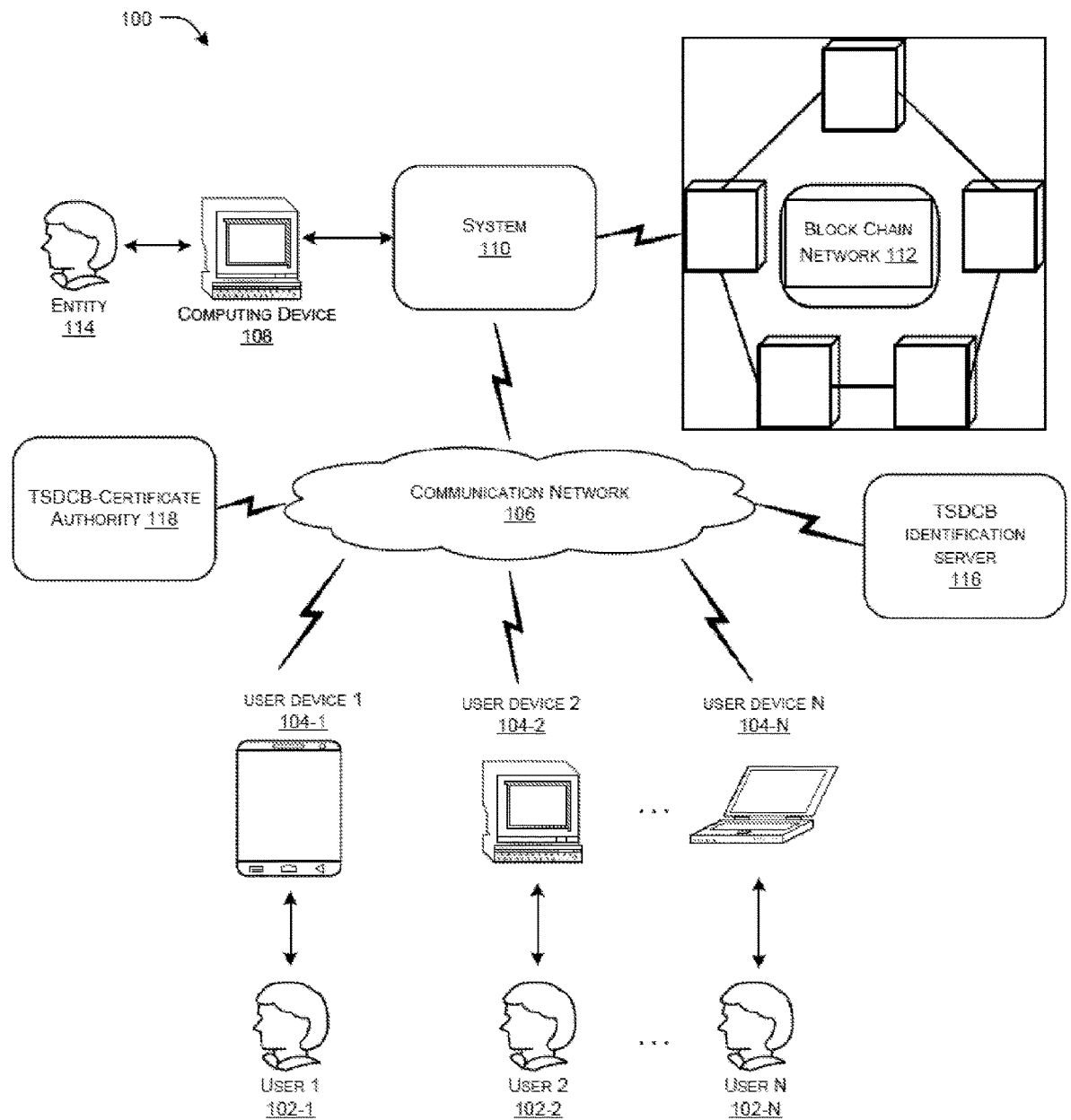
FIG. 1 illustrates an exemplary network architecture in which or with which the system of the present disclosure can be implemented for secure and traceable fund transfer operation through a distributed ledger, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Various embodiments of the present disclosure provide a system and a method for secure and traceable fund transfer operation through a distributed ledger. Embodiments herein enable an interchange between various types of currencies and facilitate scalability for global operations. Embodiments herein also facilitate better transparency of fund transfer so that audit or monitoring bodies can trace the fund transfer operations to prevent illicit operations. Embodiments herein provide flexibility to support a variety of currencies such as digital currencies, virtual currencies, global currencies, virtual tokens or digital tokens, and other such currencies. Embodiments herein support primary and secondary devices for fund transfers. Embodiments herein enable to create smart contract microservice service chains, and optimized smart contract microservice service chains that avoid the need for large distributed ledger networks and enables good scalability, wherein microservices anchors may be provided for interacting with external currencies. Embodiments herein ensure personalized blockchain ledger support for specific entities such as merchants. Embodiments herein enable monitoring and personalized blockchain ledger support for regulatory, audit, tax authorities, and other such parties. Embodiments herein enable fund transfer between real-world entities, real and virtual world entities, and between virtual world entities. Embodiments herein enable a hybrid currency system with traceable large currency notes in a digital form. Embodiments herein support personal private key wallets and secure processing services. Embodiments herein also enable the adoption of digital currencies that currently may not be used due to a lack of support for tracing the transactions.

Referring to FIG. 1 that illustrates an exemplary network architecture for secure and traceable fund transfer system (100) (also referred to as network architecture (100)) in which or with which a system (110) of the present disclosure can be implemented, in accordance with an embodiment of the present disclosure. As illustrated, the exemplary network architecture (100) may be equipped with the system (110) for secure and traceable fund transfer operation through a distributed ledger, based on a request received from one or more users (102-1, 102-2, . . . 102-N) (individually referred to as the user (102) and collectively referred to as the users (102)) associated with one or more user devices (104-1, 104-2 . . . 104-N) (individually referred to as the user device (104) and collectively referred to as the user devices (104)). The user device (104) may be associated with a sender or a receiver of funds. The system (110) may be further operatively coupled to a computing device (108) associated with an entity (114). The entity (114) may include a vendor, a network operator, a company, an organization, a university, a lab facility, a business enterprise, a defense facility, an authority, a finance department, a government, a bank, a payment service provider, or any other secured facility, and the like. In some implementations, the system (110) may also be associated with the second computing device (108). Further, the system (110) may also be communicatively coupled to one or more user devices (104) via a communication network (106). The communication network (106) may include a wireless network, a wired network, or a combination thereof that can be implemented as one of the different types of networks, such as Intranet, Local Area Network (LAN), Wide Area Network (WAN), Internet, and the like. Further, the communication network (106) may be either be a dedicated network or a shared network. The shared network can represent an association of the different types of networks that can use a variety of protocols, for example, Hypertext Transfer Protocol (HTTP), Transmission Control Protocol/Internet Protocol (TCP/IP), Wireless Application Protocol (WAP), and the like.

In some implementations, the one or more user devices (104) and the computing devices (108) may include, but are not limited to, a handheld wireless communication device (e.g., a mobile phone, a smartphone, a phablet device, a tablet device, and so on), a wearable computer device (e.g., a head-mounted display computer device, a head-mounted camera device, a wristwatch computer device, and so on), a Global Positioning System (GPS) device, a laptop computer, a tablet computer, or another type of portable computer, a media-playing device, a portable gaming system, and/or any other type of computing device with wireless communication capabilities, and the like.

In some implementations, the system (110) may be coupled to a blockchain network (112). While a single blockchain network is shown in FIG. 1, it is understood that multiple blockchain networks may be utilized for secure and traceable fund transfer operation capabilities described herein. The blockchain network (112) may also be operatively coupled to one or more user devices (104) and the computing devices (108) through the communication network (106). As illustrated in FIG. 1, the blockchain network (112) is an illustrative example in accordance with at least one embodiment of the present disclosure. The blockchain network (112) illustrates a simplified blockchain having blocks. The blocks may include a genesis block. Each block may include certain information, such as identification, or hash, that uniquely identifies the block, a timeline identifying previous blocks (e.g., the hash numbers of previous blocks) in chronological order, transactions to record all transfers between a sender and a receiver, and a public key that identifies at least one sender and at least one receiver.

The linked blocks, therefore, form a chain where each link, or block, in the chain uniquely identifies a previous link, or block, by including the hash or the prior link, or block. The blockchain network (112), maybe a distributed ledger, or blockchain may be distributed, or replicated, on a network. The distributed ledger may be replicated and maintained on a database within the underlying blockchain network (112). The blockchain network (112) (or decentralized secure transaction ledger) may be maintained by nodes in a distributed network. Although each block of blockchain network (112)/ledger may include differentiated information and may have distinct purposes, each block may include, but are not limited to, communication, a message, information, data, and the like. The blockchain network (112) may be used to send messages, or conduct transactions, between at least two entities through, for example, nodes in a network. By way of non-limiting example, a message in a block of the blockchain network (112) may include a header and contents, and the like. The header may include at least one block ID for block, a nonce value, an arbitrary number that may be used as a cryptographic hash function. These values and block information may be used in linking blocks together to form a chain.

Further, the system (110) may communicate with a Traceable Secure Digital Currency Blockchain (TSDCB) identification server (116) and a certificate authority such as a Traceable Secure Digital Currency Blockchain (TSDCB) certificate authority (TSDCB-CA) (118) for the generation of public/private keys.

Although FIG. 1 shows exemplary components of the network architecture (100), in other implementations, the network architecture (100) may include fewer components, different components, differently arranged components, or additional functional components than depicted in FIG. 1. Additionally, one or more components of the network architecture (100) may perform functions described as being performed by one or more other components of the network architecture (100).

In some implementations, the system (110) may be a standalone device and may be communicatively coupled to the computing device (not shown in FIG. 1) and/or a centralized server (not shown in FIG. 1). In another implementation, the system (110) may be associated with the computing device or the centralized server. The system (110) may be implemented in, but are not limited to, an electronic device, a mobile device, a wireless device, a wired device, a server, and the like. Such server may include, but are not limited to, a standalone server, a remote server, a cloud server, a dedicated server, and the like. In an embodiment, the system (110) may communicate with other devices or the one or more user devices (104) or the computing device (108), or the blockchain network (112) using the communication network (106). In other embodiments, the system (110) may also communicate via other various protocols and technologies such as Bluetooth®, WiFi®, WiMax®, iBeacon®, and near field communication (NFC). In other embodiments, the system (110) may also connect in a wired manner to the devices. Examples of the entity devices may include, but are not limited to, computer monitors, television sets, light-emitting diodes (LEDs), and liquid crystal displays (LCDs).

Figure 2:
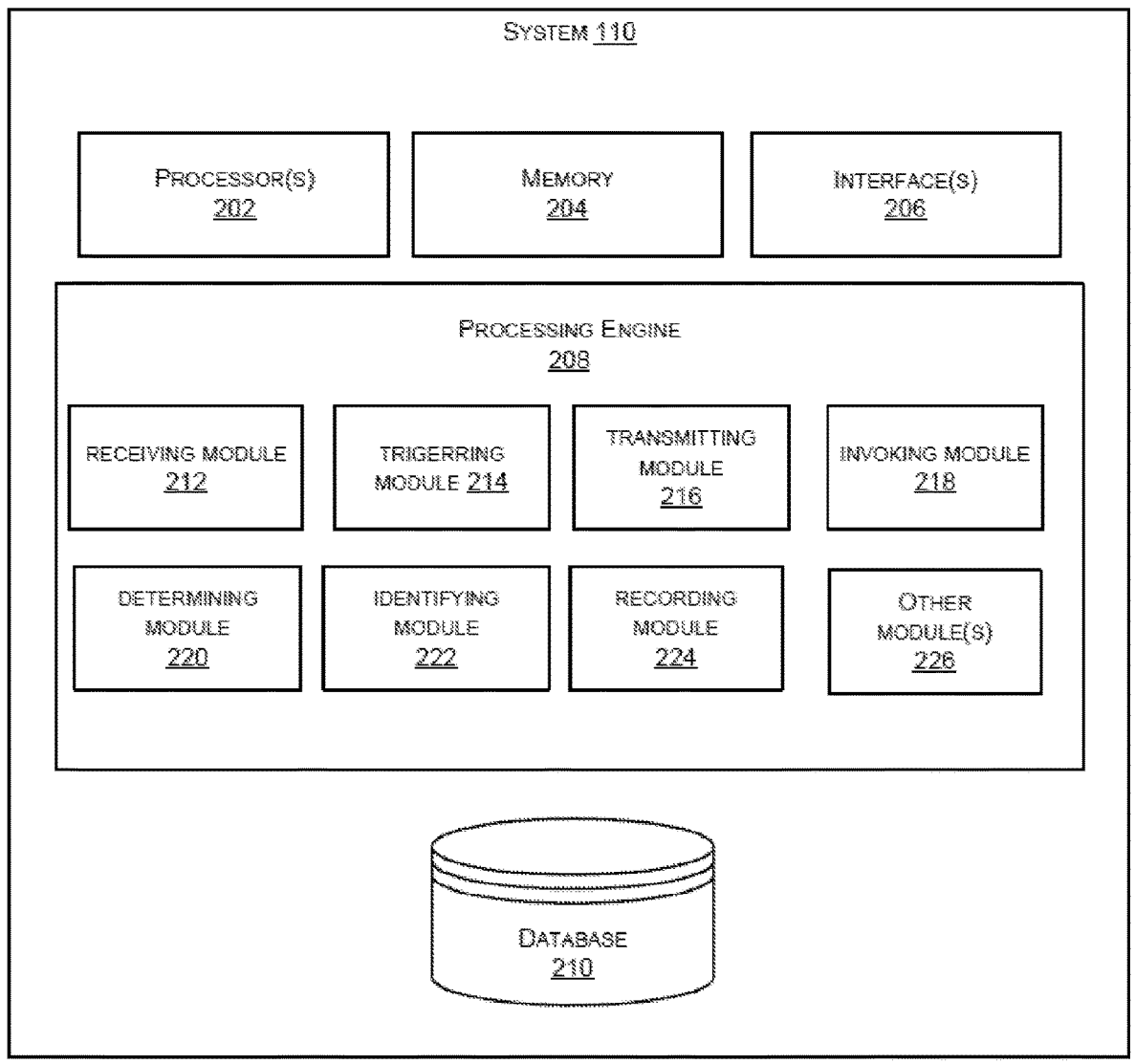
FIG. 2 illustrates an exemplary representation of a system for secure and traceable fund transfer operation through a distributed ledger, in accordance with an embodiment of the present disclosure.

In an embodiment, the system (110) may include one or more processors coupled with a memory, wherein the memory may store instructions which when executed by the one or more processors may cause the system (110) to perform secure and traceable fund transfer operation through a distributed ledger. An exemplary representation of the system (110) for the determination of congestion in the telecommunication deployment area, in accordance with an embodiment of the present disclosure, is shown in FIG. 2. In an aspect, the system (110) may include one or more processor(s) (202). The one or more processor(s) (202) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer-readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (110) may include an interface(s) (206). The interface(s) (206) may comprise a variety of interfaces, for example, interfaces for data input and output devices, referred to as I/O devices, storage devices, and the like. The interface(s) (206) may facilitate communication of the system (110). The interface(s) (206) may also provide a communication pathway for one or more components of the system (110). Examples of such components include, but are not limited to, processing unit/engine(s) (208) and a database (210).

The processing unit/engine(s) (208) may be implemented as a combination of hardware and programming (for example, programmable instructions) to implement one or more functionalities of the processing engine(s) (208). In the examples described herein, such combinations of hardware and programming may be implemented in several different ways. For example, the programming for the processing engine(s) (208) may be processor-executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may include the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry.

The processing engine (208) may include one or more modules/engines selected from any of a receiving module (212), a triggering module (214), a transmitting module (216), an invoking module (218), a determining module (220), an identifying module (222), a recording module (224), and other module(s) (226). The processing engine (208) may further be an edge-based micro service event processing engine, but not limited to the like.

In an embodiment, the system (110) may generate one or more TSDCB Account Identities (TA-IDs) for the sender and the receiver. For the generation of the TA-IDs, the receiving module (212) may receive from the user device (104) a generated the first user public key, a second user public key, and a private key. Further, the triggering module (214), may trigger a secure application on the user device to interact with a TSDCB identification server for generating a TSDCB Identity Number (TIN). The private key pair may be generated in the user device concurrently with or after obtaining the TIN from the TSDCB identification server (116). Furthermore, the receiving module (212) may receive from the TSDCB identification server (116), a generated TIN with a digital signature of the TSDCB identification server (116).

In an embodiment, the system (110) may create a TSDCB account associated with the sender, and the TSDCB account associated with the receiver, using the blockchain network. For the creation of the TSDCB account, the receiving module (212) may receive a request from the user device to create a TSDCB account and a TSDCB Account ID (TA-ID). The request includes TIN with the public key to set up a for the user. Further, the triggering module (214) may trigger a request to the user device (104), for authentication of the TIN. The user device (104) may transmit identification information in an encrypted form to the system. The user device (104) may encrypt the identification information using the public key of the TSDCB identification server (116) along with a digital signature signed by the private key. Further, the system (110) may verify the digital signature using the public key of the user device (104), and then submit the encrypted identification information message to the TSDCB identification server (116). The TSDCB identification server (116) may verify the biometric identification as belonging to the TIN and returns a success/failure notification to the system (110) along with a digital signature attested. Further, the system (110) may provide to the TSDCB-Certificate Authority (TSDCB-CA) (118), the generated public key with the TIN generated by the user device (104) to bind the public key to the TIN. The TSDCB-CA (118) may generate a certificate for the user device (104) based on the public key from the user device (104), signs the certificate. Further, the system (110) may create the TSDCB Account ID (TA-ID) for the user of the user device (104) by recording the TIN, the public key, and the certificate for the user.

In an embodiment, the receiving module (212) may receive, from at least one of the sender and the receiver associated with the user device (104), a keyword-based query to determine at least one of a first user public key associated with the receiver and a second user public key associated with the sender. At least one of the sender and the receiver may be associated with a Traceable Secure Digital Currency Blockchain (TSDCB) account. The keyword-based query includes at least one of, but are not limited to, a name, a type of currency or token, a mobile number, a Traceable secure digital currency blockchain Identity Number (TIN), and the like. Further, the triggering module (214) may trigger to the user device (104) associated with the sender, to sign off an amount to be transferred to the determined first user public key associated with the receiver of the TSDCB account. The sign-off may be performed by the sender using a private key corresponding to the TSDCB account associated with the sender.

In an embodiment, the transmitting module (216) may transmit the signed-off amount received from the user device (104) associated with the sender, to the blockchain network (112). The signed-off amount may be received via a fund transfer request to the associated TSDCB account with a digital signature attached to a transaction. In an embodiment, the receiving module (212) may receive from the blockchain network (112), a validation of the transfer request, based on validating the digital signature of the second user public key associated with the sender.

In an embodiment, the invoking module (218) may invoke a check and debit smart contract microservice, to check balance and debit in the TSDCB account associated with the sender, for transferring the signed-off amount to the receiver. Further, the determining module (220) may determine, if the TSDCB account associated with the sender and the TSDCB account associated with the receiver includes different currencies or a digital TSDCB coin or a digital TSDCB token. The currencies include at least one of, but are not limited to, traditional currencies, digital currencies, virtual currencies, global currencies, and the like.

In an embodiment, the invoking module (218) may invoke a conversion smart contract microservice for the currency conversion, before the transfer of the signed-off amount, when the TSDCB account associated with the sender and the TSDCB account associated with the receiver includes different currencies or a digital TSDCB coin or a digital TSDCB token. Further, the invoking module (218) may invoke a transfer smart contract microservice to credit the debited amount to the TSDCB account associated with the receiver, upon completion of the debit in the TSDCB account associated with the sender. Thereafter, the identifying module (222) may identify, one or more TSDCB Account Identities (TA-IDs) for the sender and the receiver, upon completion of the transfer of the signed-off amount to the receiver. Furthermore, the recording module (224) may record the transaction in a ledger associated with the blockchain network. The record includes the first user's public key associated with the receiver and the second user's public key associated with the sender, and the signed-off amount from the sender to the receiver. In an embodiment, recording the transaction in the ledger associated with the blockchain network may include the TIN associated with the TSDCB account of the sender and the receiver, a TIN associated with the transactions, the TA-IDs, public keys, and the like.

In an embodiment, the invoking module (218) may invoke monitor smart contract microservice to monitor for warning triggers including at least one of a financial transaction exceeding a certain amount, and a set of transactions within a short time window exceeding a certain amount.

In an embodiment, the system (110) may be a System on Chip (SoC) system but not limited to the like. In another embodiment, an onsite data capture, storage, matching, processing, decision-making, and actuation logic may be coded using Micro-Services Architecture (MSA) but not limited to it. A plurality of microservices may be containerized and maybe event-based to support portability.

In an embodiment, the network architecture (100) may be modular and flexible to accommodate any kind of changes in the system (110) as proximate processing may be acquired towards re-estimating of stock. The system (110) configuration details can be modified on the fly.

In an embodiment, the system (110) may be remotely monitored and the data, application, and physical security of the system (110) may be fully ensured. In an embodiment, the data may get collected meticulously and deposited in a cloud-based data lake to be processed to extract actionable insights. Therefore, the aspect of predictive maintenance can be accomplished.

In an exemplary embodiment, the communication network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber-optic network, some combination thereof.

In an embodiment, the one or more first computing devices (104) or the second computing device may communicate with the system (110) via a set of executable instructions residing on any operating system, including but not limited to, Android™, iOS™, Kai OS™, and the like. In an embodiment, the one or more first computing devices (104) may include, but are not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as a touchpad, touch-enabled screen, electronic pen and the like. It may be appreciated that the one or more first computing devices (104) may not be restricted to the mentioned devices and various other devices may be used. A smart computing device may be one of the appropriate systems for storing data and other private/sensitive information.

Figure 3A:
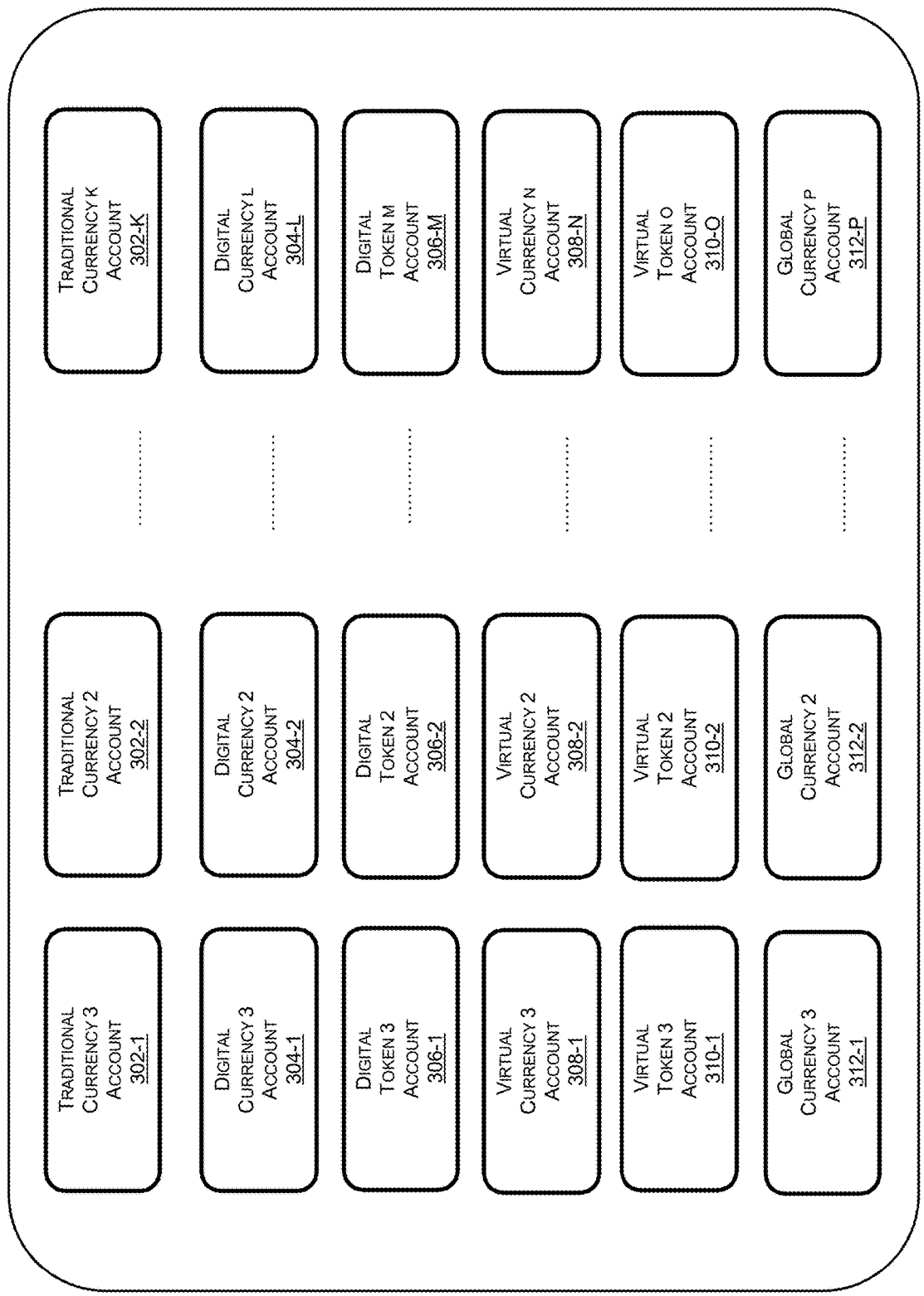
FIG. 3A illustrates an exemplary block diagram representation of composition of multi-currency Traceable Secure Digital Currency Blockchain (TSDCB) user account, in accordance with an embodiment of the present disclosure.

FIG. 3A illustrates an exemplary block diagram representation of composition of a multi-currency Traceable Secure Digital Currency Blockchain (TSDCB) user account, in accordance with an embodiment of the present disclosure. The user account may support at least one of the plurality of currencies including, but not limited to, a Traditional Currency account (TC1, TC2, . . . TCK) represented as 302-1, 302-2 . . . , 302-K, (collectively referred to as TC (302)), a Digital Token account (DT1, DT2, . . . DTM) represented as 306-1, 306-2 . . . , 306-M (collectively referred to as DT(306)), a Digital Currency account (DC1, DC2, . . . DCl) represented as 304-1, 304-2 . . . , 304-L (collectively referred to as DC (304)), a Virtual Currency account (VC1, VC2, . . . VCN) represented as VC 308-1, 308-2 . . . , 308-N (collectively referred to as VS (308)), a Virtual Token account (VT1, VT2, . . . VTO) represented as 310-1, 310-2 . . . , 310-O (collectively referred to as VT (310)), a Global Currency account (GC1, GC2, . . . GCP) represented as 312-1, 312-2 . . . , 312-P (collectively referred to as GC (312)) and other such currencies. The virtual currency may include, but are not limited to, cryptocurrency, and other such currencies that may be legally approved. The traditional currency and global currency may include, but are not limited to, examples such as Rupees, Dollars, Euros, Pounds, and various other currencies known traditionally or globally. In an embodiment, the system (110) may enable the user fund account to support at least one currency and/or a token. In another embodiment, the system (100) may enable the user fund account to support at least one type of global currency that can be either traditional global currencies or digital versions of global currencies. In an embodiment, the system (110) may enable interchange across the plurality of currencies such that one type of currency supported by the user fund account may be interchanged to another type of currency.

In an embodiment, the distributed ledger-based system such as the system (110) may facilitate the generation of public/private key pairs for a user fund account and/or a user, such that the public/private key pairs may be issued by a certificate authority such as the TSDCB certificate authority (118) associated with the system (110). In an embodiment, the distributed ledger of the system (110) may be the blockchain network (112). In an exemplary embodiment, the distributed ledger associated with the system (110) may be permissioned private blockchain system to execute and record transactions, with access provided to key entities such as income tax authorities and governing financial authorities such as, for example, but are not limited to, a Reserve Bank of India (RBI) or the National Payments Corporation of India (NPCI) in India, or the Securities and Exchange Commission (SEC) in the United States of America (USA), and in India or the USA, and the like. Various other examples of financial, income tax, or governing authorities may also be included. In an embodiment, a plurality of currencies may be supported such that the system (110) may enable a provision for anchor support for conversion from one type of currency to another type of currency. In an embodiment, the system (110) can be used to exchange currency between a physical-digital world and/or a virtual digital world, or for fund transfer in virtual digital worlds and/or in the physical-digital world.

In an embodiment, the system (110) may allow each user having a system-approved identity to have an access to a public-key/private-key pair that may be issued by the TSDCB certificate authority (118). The system (110) approved identity may be generated based on a unique traceable identity issued by the national authorities, such as, but are not limited to, for example, a biometric-based identity such an Aadhaar card or a virtual Aadhaar Identity in India, Personal Account Number (PAN) ID, social security number in the USA and other such identities, wherein traceable identification information associated with the user account may be used. The TSDCB certificate authority (118) can be accessed through an executable set of instructions on the user device (104) associated with the user (102). In an embodiment, for the user (102) with multiple user devices (104) (such as phones or a travel-assist electronic card, etc.), separate public-key/private-key pairs can be issued for each user device (104) associated with the user (102). The private key associated with the user device (104) may enable to access the amount in the user fund account. In an embodiment, multiple public-key/private-key pairs corresponding to the system-approved identity can be mapped to the same user account.

In an embodiment, the system (110) may enable retrieval of information regarding fund account balances, which may be encrypted by the system (110) based on the public key associated with the user (102), so that only the specific user device (104) that contains the corresponding private key can decrypt and display the information to the user (102). To mitigate fraud, other communications from the system (110) (such as interactions related to OTPs or PINs) can also be encrypted using the public key from the user device (104), so that intermediate nodes on the network cannot decrypt such messages in transit. In an embodiment, for user traceability, the system-approved identity may be backed up by the unique traceable identity (issued by valid authorities) for the user (102) that can be used to map to a specific public key. Therefore, when creating a new user fund account, the system (110) may mandate biometric identification or alternative identification processes, such as manual verification of identity, such as a social security number in the USA, to be utilized while setting up the account. This implies that mapping from each account public-key to system-approved identity or unique traceable identity (such as an Aadhaar number) may be possible. It may be appreciated that the present disclosure may not be limited by the mentioned embodiments and/or examples and several different embodiments may be realized by the implementation of the system and method of the present disclosure.

In an embodiment, the system (110) may also enable interaction with a participating entity (or their devices) such as including, but are not limited to, merchants, corporate entities, and the like. The system (110) may onboard the user (102) and/or participating entity by using solution depending on regulatory requirements, such as, including, but are not limited to, alternate KYC mechanisms, such as, for example, based on PAN (Permanent Account Number) in India or the Social Security Number (SSN) or based on personal or working addresses, and the like. Various other attributes may be considered for onboarding the user and/or participating entity.

Figure 3B:
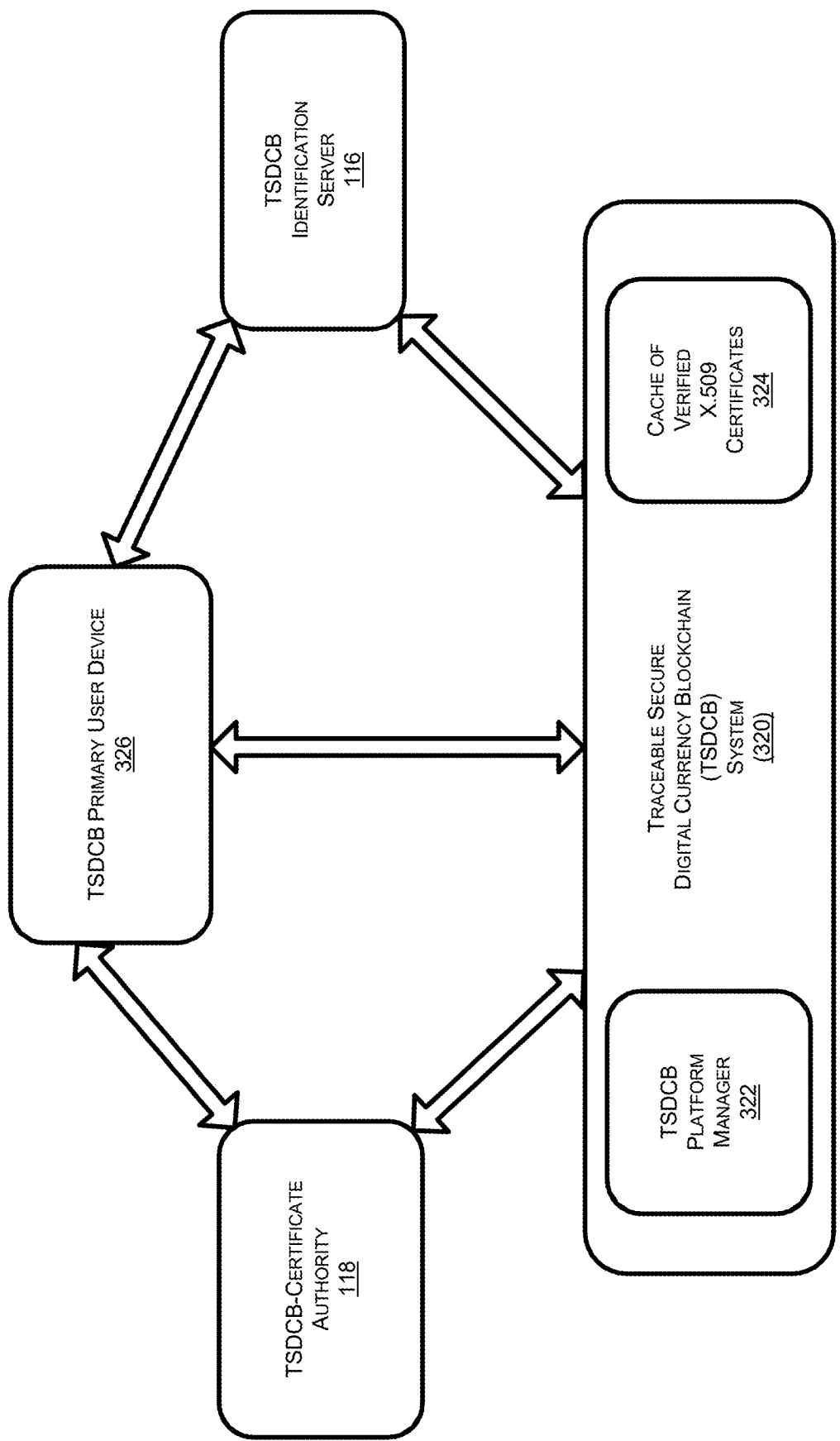
FIG. 3B illustrates an exemplary flow diagram representation of TSDCB accounts creation and processing transaction, in accordance with embodiments of the present disclosure.

FIG. 3B illustrates an exemplary flow diagram representation of TSDCB accounts creation and processing transaction, in accordance with embodiments of the present disclosure. Various nodes and components involved in a distributed ledger supported system (110) is shown in FIG. 3B. As illustrated in FIG. 3B, the distributed ledger associated with the system (110) may correspond to a blockchain, wherein the system (110) may be hereinafter referred to as Traceable Secure Digital Currency Blockchain (TSDCB) system (320). The TSDCB system (320) may include a TSDCB platform manager (322) and a collection or cache of verified certificates (324). The TSDCB system (320) may interact with TSDCB primary user device 326 (hereinafter also referred to as the user device (104)) that may be a device on which the user may be enabled to access a set of executable instructions (application) for account creation and/or performing a fund transfer. The TSDCB system (320) may communicate with the TSDCB identification server (116) and the TSDCB certificate authority (TSDCB-CA) (118), referred to as TSDCB certificate authority for generation of public/private keys. The TSDCB system (320) may enable the creation of a user fund account (interchangeably referred to as TSDCB account) supporting a plurality of currencies. In an exemplary embodiment, the TSDCB account may be created using asymmetric cryptography, such as, for example, but are not limited to, using an Elliptic Curve Digital Signature Algorithm (ECDSA-521) algorithm by using a key size of size 521 based on the secp521r1 curve ASN.1 OID along with a quantum-resistant ECDSA-with-SHA512 hash algorithm for the digital signature, and the like. Various other techniques may also be employed in the generation of the account. In an exemplary embodiment, biometric validation may be performed at the time of account creation to link the user to biometric identity or an already established unique traceable identity (such as an Aadhaar or virtual Aadhaar ID in India that may be confirmed at the time of biometric verification by a TSDCB Identity Verification server (not shown in FIG. 3B) such as the UIDAI). The TSDCB system (320) may also enable the generation of a user TSDCB Identity Number (TIN) and also user fund account identity (TSDCB Identity or TSDCB-ID) upon setting up of the user fund account. In an exemplary embodiment, an Elliptic-curve Diffie-Hellman (ECDHE) session may be set up with the TSDCBCertificate Authority (118) to securely exchange information between the user device and the TSDCB-CA (118) as shown in FIG. 3B.

In an embodiment, the TSDCB-CA (118) can be used to issue X.509 certificates for each user fund account (TSDCB user account). In an exemplary embodiment, the user device (104) can be provided with aSoftware Development Kit (SDK) to generate its own public-key/private-key pair, which may be executed in a secure partition on the device such as a Trusted Execution Environment (TEE) using ARM TrustZone (TZ) for ARM-based user device or smartphones/feature phones or in a secure enclave such as Intel SGX for x86-based systems. In an embodiment, the public-key/private-key pair may be created using, for example, the elliptic curve ECDSA-521 algorithm. In an exemplary embodiment, a Root Key may be fused to the user device (104), and derived keys may be created to create a key hierarchy where such derived keys can be encrypted with the Root Key. In another exemplary embodiment, derived keys may be recursively encrypted with other derived keys until the root key is reached in the key hierarchy. The derived key in the key hierarchy on the platform may be utilized to encrypt the private key and stored in a secured memory location on the user device. Various other exemplary embodiments may be possible.

Figure 3C:
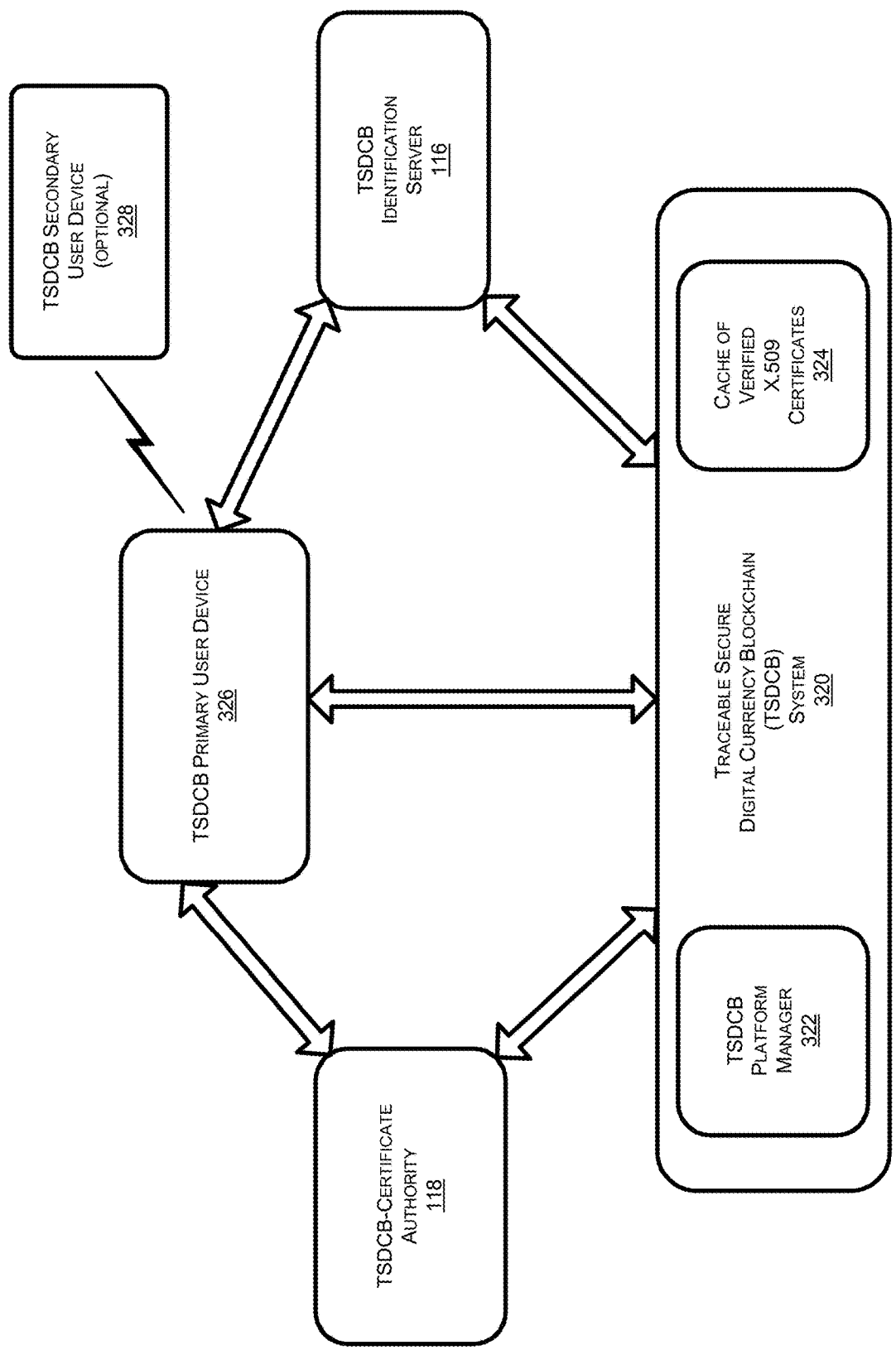
FIG. 3C illustrates an exemplary flow diagram representation of processing transactions for a secondary user device, based on computational requirements, in accordance with an embodiment of the present disclosure.

FIG. 3C illustrates an exemplary flow diagram representation of processing transactions for a secondary user device, based on computational requirements, in accordance with an embodiment of the present disclosure. The exemplary block diagram representation in FIG. 3C depicts an additional TSDCB secondary user device (328) (hereinafter also referred to as a secondary user device). The TSDCB system (320) may facilitate a public-key/private-key pair to be associated with a single TSDCB Identity or the TSDCB Identity Number (TIN) of the user (102) for a primary user device (326) such as a smart-phone or a feature-phone, a laptop and other such electronic computing devices associated with the user. The user (102) may also use the secondary user device user for TSDCB-platform based transfers. For example, a user may have a smartphone (that may be a primary user device) with a TSDCB Account ID (i.e. unique identity related to the user fund account, also referred to as (TA-ID)), and a secondary user device (328) such as a smart electronic travel card that may be used across different types of local transportation in a smart city that also uses the same TSDCB account. The system (110) of the present disclosure may enable a consolidated solution by enabling the user to use a one single or common user public key/user private key pair for a common TA-ID across both primary and secondary devices with a one-to-one mapping between the TA-ID and the TSDCB Identity Number (TIN) associated with the user. In an exemplary embodiment, one of the devices may be allowed to function as a secondary device (328) that binds with a primary device (326) such that the secondary device (328) may leverage credentials of the primary device for account access. In another exemplary embodiment, secure peer-to-peer (P2P) mechanisms may be available using P2P protocols such as, for example, Bluetooth-Low Energy (LE) can be used to pair the secondary device (328) with the primary device (326). Various other mechanisms may be possible. It may also be possible to list all the secondary user devices (328) associated with the user (102) that can be maintained and allowed to utilize the primary user device (326). The secondary devices (328) may use a common primary public-key/private-key pair on the primary user device (326), with additional information provided during transaction submission that the fund transfer originated from the secondary device (328) such as a universal smart travel card, and the like. In an exemplary embodiment, the smart travel card may bind with the primary user device over a short-range communication technology such as Bluetooth-LE as shown in FIG. 3C. In an exemplary embodiment, biometric identification may also be enabled via such a secondary user device (328) if needed. In another exemplary embodiment, one or more secondary devices may be used, such as, for example, secondary devices (328) that are directly addressable with IPv6 and have the ability to generate their own public/private key-pairs. Such secondary devices (328) may have their public keys registered separately with the TSDCB system (320) so that a different TA-ID may be associated with each such additional user public key, so that multiple TA-IDs may be mapped to the same TIN. In an example, for each TA-ID associated with each such additional secondary user device (328), a separate X.509 certificate may be used, thereby enabling additional TA-IDs and user public keys to be utilized if desired for secondary devices, for easy differentiation between the different devices as desired. Various other exemplary embodiments may be possible.

In reference to any or both of the embodiments as described in FIGS. 3B and 3C, some operational embodiments are being described commonly. In an embodiment, the TSDCB account (user fund account) may support different types of currencies such as including but are not limited to, fiat US Dollar, the fiat Rupee, or the digital TSDCB Coin or a digital TSDCB Token and other such currencies. Each of the different currencies may leverage a different public-key/private-key pair in the TSDCB system (320). In an exemplary embodiment, the TSDCB system (320) may enable the user to access all currencies supported in the TSDCB account through a common public-key/private-key pair across currencies, with merely additional information being provided at the time of transaction submission regarding the currency being transferred. This may enhance the user experience as the user (102) be able to work with a single public-key/private-key pair for a TSDCB account associated with a given TSDCB Identity. In another embodiment, depending on whether the TSDCB system (320) utilizes any of many-to-one mapping of TSDCB Account IDs (TA-IDs) to a TSDCB Identity Number (TIN) or a one-to-one mapping between the TA-ID and the TIN, the TSDCB-CA may be able to maintain mappings for each TIN. In an exemplary embodiment, a one-time biometric authentication may be mandated to activate a TSDCB Account ID (TA-ID). In the case of one-to-one mapping, the activation process may determine if there are any prior accounts associated with the same user/TSDCB Identity Number (TIN), based on which the TSDCB system (320) may not allow the activation of a new TA-ID. In another exemplary embodiment, in the case of a many-to-one mapping between TA-IDs and a single TIN, the activation process may not allow the activation of a new TSDCB Account ID (TA-ID), if the number of already existing TA-IDs has reached the permissible limit for the corresponding TSDCB Identity Number (TIN) associated with the user. Various other exemplary embodiments may be possible.

In an embodiment, assuming a single user public key/user private key pair is used along with a TIN that may be associated with a single TA-ID, the user public key can be utilized for one or more of the different currency accounts as shown in FIG. 3A. In another embodiment, if different user public keys need to be used for different TSDCB accounts, then additional user public keys and corresponding TA-IDs can be created for the same user. In another embodiment, the user public keys and the corresponding TA-IDs associated with each of the currency accounts that are required by the user are stored on a TSDCB platform or a database associated with the TSDCB system (320). If multiple TA-IDs may be needed for each user, then they are all mapped to the unique TIN for that user that may be stored in the TSDCB platform. In an embodiment, for each currency account, additional keywords may be stored (such as the phone number or user name) to look up the user's public key for that user (102). The user public key may be used to submit financial transactions. In an embodiment, it may be possible to internally convert the user public key to the TA-ID so that a currency or token account balance is stored with respect to the TA-ID corresponding to that user public key.

In an exemplary embodiment, if at least one currency from the plurality of currencies currency is hosted by the TSDCB system itself, at least one currency may be exchanged on the TSDCB platform. In another exemplary embodiment, at least one currency from the plurality of currencies may be exchanged on an alternate platform such that the alternate platform may itself include (optionally), a blockchain technology-based ledger. In this case, the TSDCB system (320) may record the closure of the transaction on its blockchain ledger along with the traceability of the two transacting users. It may be appreciated that the present disclosure may not be limited by the mentioned embodiments and/or examples and several different embodiments may be realized by the implementation of the system and method of the present disclosure.

Figure 4A:
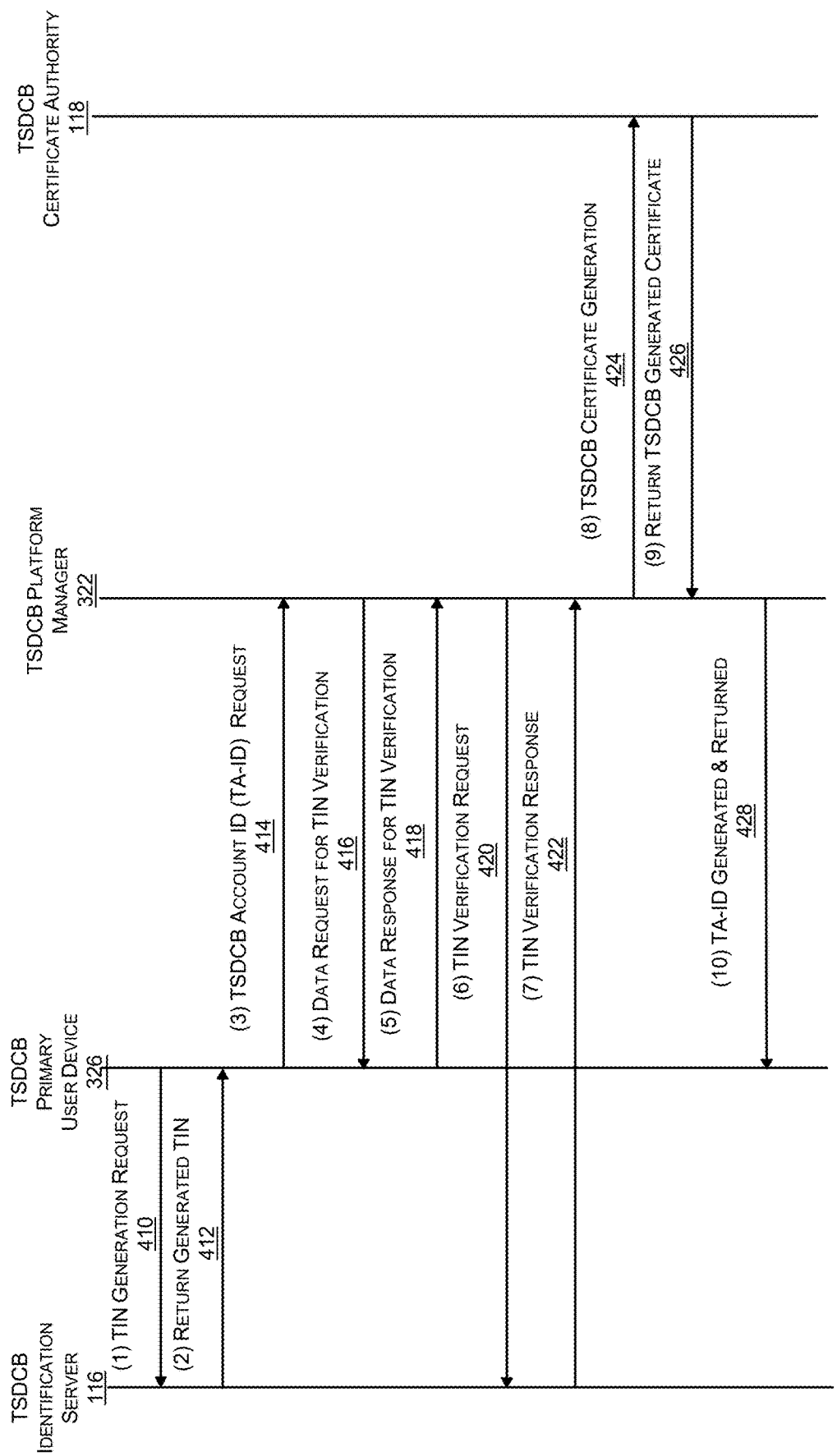
FIG. 4A illustrates an exemplary sequence diagram representation for creating a user fund account, in accordance with embodiments of the present disclosure.

FIG. 4A illustrates an exemplary sequence diagram representation for creating a user fund account, in accordance with embodiments of the present disclosure. The primary user device (326) may generate a user public key/user private key pair, before or concurrently with or after obtaining the TIN from TSDCB Identification Server (402) as described below. In an embodiment, the generation of the user public key/user private key pair may be performed in a secure partition on the user device platform such as including, but not limited to, ARM TrustZone or an Intel SGX enclave. In an embodiment, the key pair generation is performed preferably using the elliptic curve ECDSA-521 algorithm or using any other alternative algorithm such as RSA. In another embodiment, it may also be possible to offload the processing and storage to a Trusted Execution and Storage Environment on the TSDCB itself, as desired.

As illustrated in FIG. 4A, at step (410), a secure set of instructions (application) may be initiated on TSDCB primary user device (326) to interact with the TSDCB identification server (116) (such as a biometric identification server (such as UIDAI) or others) to generate a TSDCB Identity Number (TIN) of the user (102) (such as a virtual Aadhaar ID or others). In an embodiment, if biometric identification information (such as a fingerprint and/or an iris scan) may be used then the biometric identification information can be taken as input at a TSDCB account management kiosk and submitted to the TSDCB identification server (116) to obtain an ID that can be utilized as the TSDCB Identity Number (TIN). At step (412), the TSDCB identification server (116) may create the TIN, and includes a digital signature of the TSDCB identification server (116) along with generated TIN and returns the digital signature back to the TSDCB user device (primary and/secondary user devices) (326). At step (414), the TSDCB primary user device (326) then submits the TIN along with the user public key (that is generated along with the nature of the key generation algorithm whether ECDSA-521 or an RSA-2048 or other algorithm) to the TSDCB Platform Manager (TSDCB-PM) (322) to set up a TSDCB Account ID (TA-ID) for the user.

At step (416), the TSDCB-PM (322) then initiates a request for verification of the TIN to the TSDCB primary user device (326). At step (418), the TSDCB primary user device (326) mat then submits identification information (such as biometric identification generated at the account generation desk) to the TSDCB-PM (322). In an embodiment, the identification information may be submitted in an encrypted form to the TSDCB-PM (322) and it may be encrypted with the public key of the TSDCB Identification Server (402) along with a digital signature signed by the user private key. At step (420), the TSDCB-PM (322) may verify the digital signature using the Public Key of the TSDCB user device (326), and then submits the encrypted identification information message to the TSDCB Identification Server (402). At step (422), the TSDCB identification server (116) may verify the biometric identification as belonging to the TIN and returns a success/failure notification to the TSDCB-PM (322) along with an attested digital signature. At step (424), to generate the TSDCB Account ID for the user, the TSDCB-PM (322) may submit the user public key generated by the TSDCB user device (326) along with the TIN. In an embodiment, the details may be shared over an ECDHE session with the TSDCB Certificate Authority (TSDCB-CA) (118) to bind the user's public key to the TIN. At the same step (424), subsequently, the TSDCB-CA (118) may generate a certificate (such as X.509 certificate) for the TSDCB user device (326) based on the user device public-key, such that the certificate may be signed shares it with the TSDCB-PM (406). At 426, the TSDCB-PM (406) may receive the certificate from the TSDCB-CA (322).

At step (428), the TSDCB-PM (322) may then create an Account ID for the user by recording the TIN, the user public key, and the X.509 certificate for the user (102). The TSDCB Account ID (TA-ID) can be identified by the user public key associated with the user, or a hash of the user public key. Alternatively, the TSDCB account id (TA-ID) can be identified based on the TIN, or a hash of the TIN. Alternatively, further, the TA-ID can be identified by combining information from the user public key or the TIN such as a concatenation of the two IDs given by (user public key||TIN) or by computing a hash such as a hash (user public key||TIN), for example, a SHA3/SHA512 hash of the concatenation of the user public key and the TIN. Furthermore, any transformation based on the user public key and/or the TIN may be used as the TA-ID. For example, an additional nonce (a one-time random number) be generated and also used in the concatenation such as (user public key||TIN||User Nonce) and the concatenation or a hash of the concatenation hash (user public key||TIN||User Nonce) could be used as the TA-ID. The TSDCB-PM then shares the TA-ID and the corresponding X.509 Certificate with the user device. At this time, the TSDCB user device (326), TSDCB-PM (322), and the TSDCB-CA (118) may have the certificate for the user device mapped to the TA-ID associated with the user account. In an embodiment, the account creation may be performed if TSDCB Identity Number (TIN) is to be generated just before TSDCB Account ID (TA-ID) creation. If the TIN is already available, then steps (410) and (412) can be skipped in the TA-ID creation process. Various other embodiments are possible. In an embodiment, for enhanced security, all of the steps in the above process as illustrated in FIG. 4 can be executed in a Trusted Execution Environment (TEE) on an Intel™ SGX enclave if the TSDCB user device (404) supports IntelSGX, or it could execute in ARM TrustZone on an ARM-based device, and/or the set of executable instructions on the TSDCB user device (404) can execute in a secure partition such as on a virtual machine or a container that executes a microservice associated with the account generation process described above. It may be appreciated that the present disclosure may not be limited by the mentioned embodiments, steps, and/or examples and several different embodiments may be realized by the implementation of the system and method of the present disclosure.

The previously disclosed embodiments may establish the association between the user public key, the TIN, and the TA-ID about the user/user device or user fund account. In an embodiment, additionally, a user may be given a login username and password credentials to log in to the TSDCB platform for authentication. In an exemplary embodiment, dual-factor authentication can also be used when needed, and in some cases, only a single-factor authentication may be used to process fund transfer. In an embodiment, the user may log in with appropriate credentials for a primary factor authentication, followed by using an OTP sent to a mobile device as a secondary factor authentication for example. Various other embodiments may be possible. In an embodiment, the term "fund transfer" may pertain to transfer and/or interchange of any or a combination of a traditional currency (302 of FIG. 3A), a digital token (306 of FIG. 3A), a digital currency (304 of FIG. 3A), a virtual currency (308 of FIG. 3A), a virtual Token (310 of FIG. 3A), a global currency (312 of FIG. 3A) and other such currencies between multiple accounts of the same user and/or two different accounts of a user and a fund recipient. Various other scenarios may also be applicable.

Figure 4B:
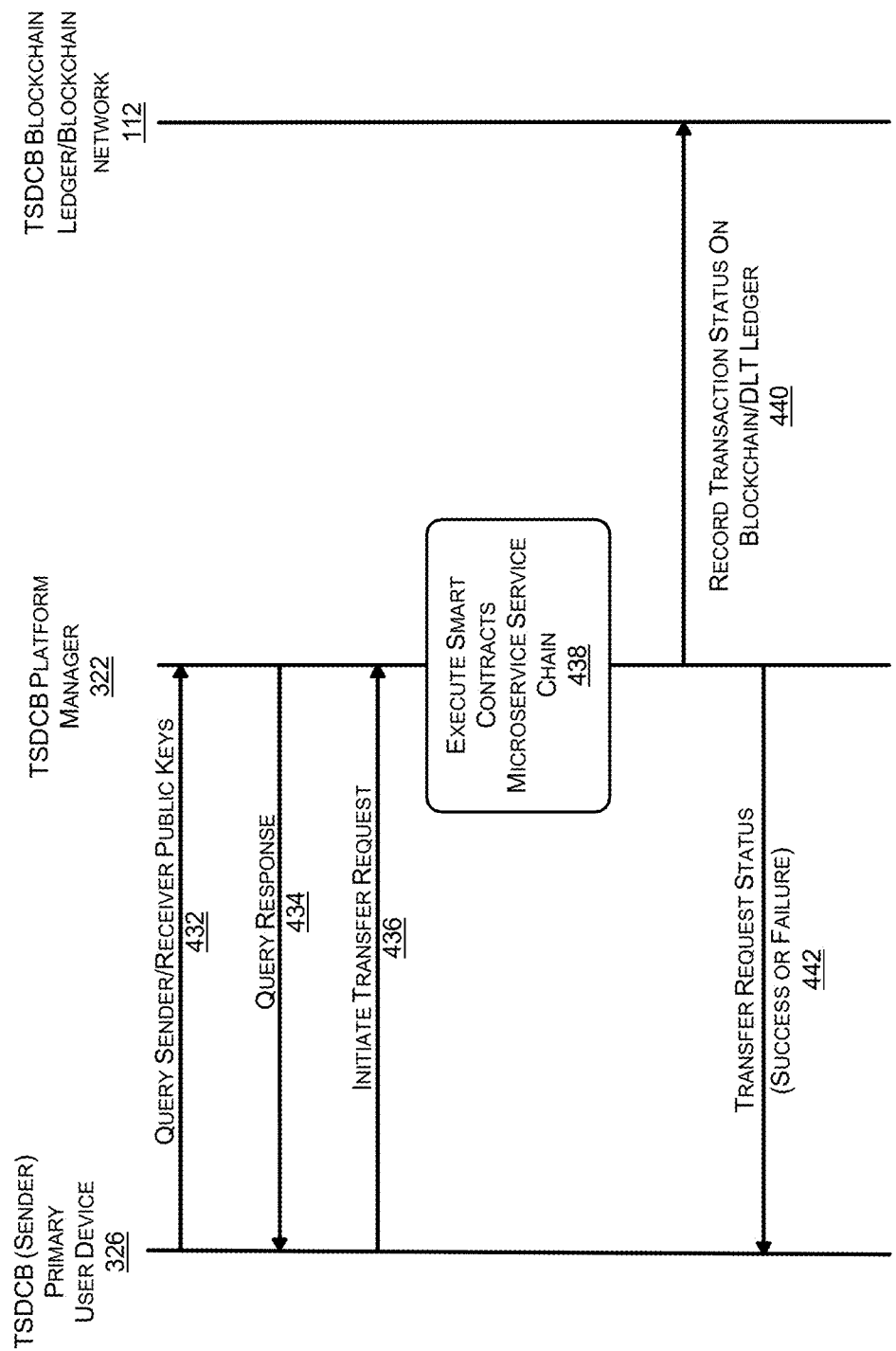
FIG. 4B illustrates an exemplary sequence diagram representation of fund transfer with respect to the different types of currencies supported by user fund account and subsequent recording in the distributed ledger, in accordance with embodiments of the present disclosure.

FIG. 4B illustrates an exemplary sequence diagram representation of fund transfer with respect to the different types of currencies supported by user fund account and subsequent recording in the distributed ledger, in accordance with embodiments of the present disclosure. As illustrated in FIG. 4B, a microservices-based TSDCB platform can be utilized for scalable processing of blockchain transactions in a microservices-based framework. For example, the microservices-based platform may utilize asynchronous and concurrent processing in a producer-consumer distributed ledger paradigm with a scalable microservices-based infrastructure to achieve high performance. Alternatively, other variants of blockchain platforms can also be used to realize the system. Various other implementations may also be applicable. The implementation of smart contract microservices may be done to enable different functions such as including, but not limited to, a smart contract microservice to check the account balance in a specific currency or token account, a smart contract microservice to check the account balances in a group of currencies (such as all digital currencies, or all virtual currencies or all global currencies, or all digital tokens), a smart contract microservice to lookup a user public key based on keywords associated with the user, a smart contract microservice to transfer money from one account of a user to another account belonging to the same user, a smart contract microservice to transfer money from one account of a user to another account belonging to a different user and several other functions/objectives. Various other objectives may also be applicable.

For sending funds from a user fund account (user or sender TSDCB account) on the TSDCB platform, the sending user may first log into the account. The user private key associated with the TSDCB account can then be utilized to transfer funds from the sender (identified by the sender's user public key to a receiver's user public key). At step (432), the user (sender) via the TSDCB primary user device (326) can use a keyword-based query (based on the name, the type of currency or token, the phone number, or TIN) to look up to find its (sender's) user public key. The sending user can use a similar keyword-based query lookup to find the (receiver's) user public key for the receiver's account. The private key associated with the sender's TSDCB Account is utilized to sign off the amount being transferred to the public key associated with the receiver's TSDCB account, and this signed transaction can be submitted at step (434), to the TSDCB-PM (322) for processing. At step (434), the TSDCB-PM (322) can first "validate" the transfer request by validating the digital signature (such as based on the X.509 certificate for the sender's user public key). At step (436), the sending user initiates via the TSDCB primary user device (326) a funds transfer request to the TSDCB-PM (322) with a digital signature attached to the transaction. At step (438), a "check and debit" smart contract microservice can be invoked at the TSDCB platform manager (322), which checks the sender's account balance and debits the sender's account to enable the transfer. Once the debit is completed, another "transfer" smart contract microservice can be invoked to credit a receiving account. At step (440), based on the user public keys for the sender and the receiver, the corresponding TA-IDs for the sender and the receiver are identified, so that the blockchain ledger can record the transfer between the sending and receiving accounts on the TSDCB platform. At step (442), the TSDCB-PM (322) returns a success/failure notification to the TSDCB sender user device (326). In an embodiment, if the sending and receiving accounts belong to different currencies or tokens, then an additional "conversion" smart contract microservice can be invoked to enable the conversion before completing the transfer.

FIG. 5A illustrates an exemplary flow diagram representation of a TSDCB based microservice service-chain for the account transfer, in accordance with embodiments of the present disclosure. A service chain of smart contract microservices (as introduced in FIG. 5A) can be dynamically invoked based on the needs of the fund transfer. In an embodiment, each microservice can be executed in a container or a virtual machine. As illustrated in FIG. 5A, at step (502), a transfer request may be validated. At step (504), TA-IDs (associated with user fund account)may be identified for transfer. At step (506), sending the user's debit account may be checked and debited. At step (508), currency or tokens may be converted or interchanged, based on the requirements of the fund transfer. At step (510), the fund transfer may be completed. In an embodiment, the currency/token conversion microservice (step 508 of FIG. 5A) can be executed in parallel with the microservice to check-and-debit the sender's account balance (step 506 of FIG. 5A) such that an optimistic execution schedule can be created as shown in an exemplary representation in FIG. 5B, in accordance with an embodiment of the present disclosure. The other steps related to transfer request validation (552), identifying TA-IDs for transfer (554) are executed similarly to as described in FIG. 5A. Although, the embodiment may realize a drawback that if the check-and-debit operation (558) fails, then the currency conversion task (556) may be a wasted execution. However, an advantage of the exemplary implementation of FIG. 5B may include that if the check-and-debit operation (658) succeeds, then the overall service chain can complete faster (560).

In an aspect, the TSDCB system (320) as described in the aforementioned figures may also enable governing authorities or authentic financial regulatory authorities to monitor or trace one or more aspects of the fund transfer, which may be extremely difficult or impossible in conventional systems. The aspect of being able to trace the aspects of the fund transfer may be a key emerging requirement for regulatory and government authorities around the world, which that TSDCB system may be able to perform, via for example, based on the TSDCB Identity while utilizing public-key/private-key asymmetric cryptography to support payment transfers across users. In examples such as a Peer-to-Peer (P2P) financial transaction on the platform, the fund being transferred from a sender's account can be debited, and then credited to a receiver's account, with the information record related to the amount transfer recorded on the TSDCB platform, the audit capabilities may involve several alternatives or features. This may include, but are not limited to, TIN associated with the sender's and receiver's accounts can be included in a transaction record in the blockchain ledger. Alternatively, the TSDCB platform can merely record the transactions based on the TA-IDs and user public keys for the sender and receiver's accounts, and merely provide a lookup in the future to report the TIN associated with the TA-IDs or the user public keys associated with the accounts. As another aspect, in addition, the TSDCB platform can create a personalized ledger purely for the audit authority by creating a personalized blockchain ledger transaction chain where that personalized ledger chain could include additional information such as the TIN associated with the transactions being processed in the system. Various other aspects/features may be possible. The TSDCB system has a key difference from the conventional systems such that there is no need for a large distributed blockchain network to manage the payment transfer, which is otherwise required in conventional systems. In an embodiment, only key entities such as participants (merchants, banks, or users) are involved in a transaction and neutral entities (such as a regulatory authority or a blockchain platform manager owner entity) may be direct participants on a permissioned private blockchain network hosted by the TSDCB platform. The TSDCB account users may be hosted by a user blockchain node, where multiple such nodes could be utilized to allow the system to scale and enable concurrent data processing across users. The core blockchain network may be extended for specific use-cases to include merchants in stores to enable transfers between TSDCB accounts of merchants and individual users such that merchants can access the blockchain platform via a merchant blockchain node. The permissioned private network utilized in the core blockchain network of the present disclosure may enable the platform to scale well across users and merchants.

In an embodiment, a regulatory authority (or audit or tax authority) may receive a personalized ledger chain for transactions that relate to that regulatory or audit or tax authority. For such a personalized ledger chain, the transactions can be augmented with additional information such as traceable identity information (such as the TIN—for example, an Aadhaar ID or a virtual Aadhaar ID, and/or a PAN ID in India, or a social security number in the USA) to allow such a regulatory/audit/tax authority to trace transactions. For example, a tax authority may be interested only in transactions that exceed a certain amount, or if an aggregate set of transactions between the same pair of users exceed a certain amount within a given timeframe. In such cases, a personalized ledger can be created with transaction information recorded to trace the individuals and/or merchants/businesses engaged in such transfers. In an exemplary embodiment, a monitoring agent may be included to monitor one or more aspects of the TSDCB platform.

Figure 6A:
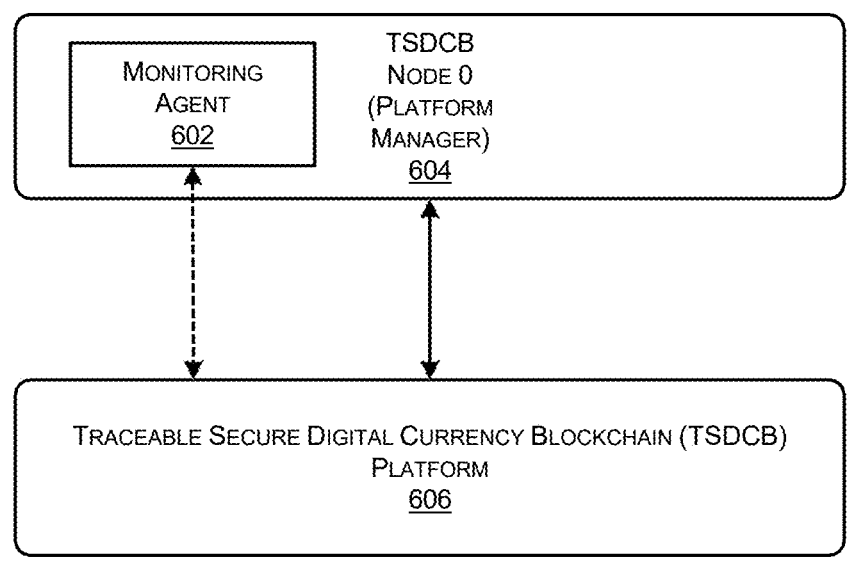
FIG. 6A illustrates an exemplary block diagram representation of a monitoring agent for recorded transactions, in accordance with embodiments of the present disclosure.

FIG. 6A illustrates an exemplary block diagram representation of a monitoring agent (602) for recorded transactions, in accordance with embodiments of the present disclosure.

The monitoring agent (602) can be included as part of code executing the TSDCB Node 0 (Platform Manager) (604) that observes the transactions and their status on the TSDCB platform (606) as shown in FIG. 6A. The monitoring agent (602) can be configured to trigger a message creation on a personalized ledger chain for a regulatory/audit/tax authority. The contents of the transaction that is recorded in the ledger can include the conditions that may have been met for the message creation, a time-stamp associated with the transaction, the TIN/traceable identity information associated with the transacting users or entities, and other such details. The monitoring and personalized ledger creating functions may be executed as additional concurrent processing microservices tasks in the system along with other tasks being processed. In an embodiment, endorsements based on digital signatures (such as using the ECDSA-with-SHA512 algorithm) from participating entities for a given transaction may be captured and recorded along with transaction data in the blockchain ledger. The corresponding digital certificates for the participating entities can also be stored along with the transaction data in the blockchain ledger. However, since these digital certificates are likely to be repeatedly used, the system can merely record a hash associated with the digital certificates of transaction participants, with the corresponding digital certificates stored external to the ledger. This may minimize the overall size of the blockchain transaction data in the blockchain ledger.

Figure 6B:
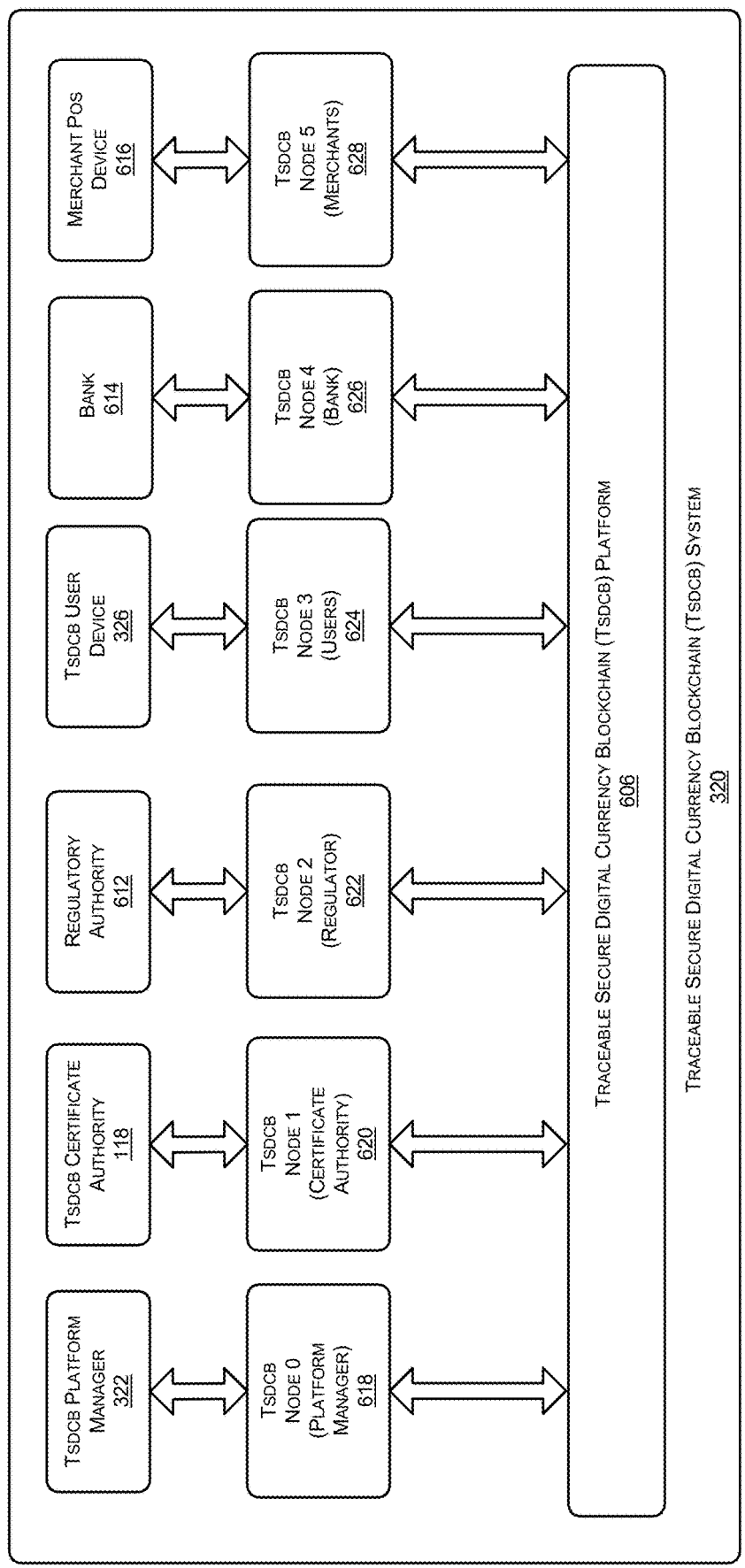
FIG. 6B illustrates an exemplary block diagram representation of an architecture of TSDCB system that may involve communication or interaction between various parties/authorities and corresponding nodes, in accordance with embodiments of the present disclosure.

FIG. 6B illustrates an exemplary block diagram representation of the architecture of the TSDCB system (320) that may involve communication or interaction between various parties/authorities and corresponding nodes, in accordance with embodiments of the present disclosure. As illustrated in FIG. 6B, the TSDCB system (320) may include a Traceable Secure Digital Currency Blockchain (TSDCB) platform (606), which may associate with multiple nodes related to the various parties/authorities such as users, regulators, financial organizations such as banks and merchants. The TSDCB platform (606) may interact with one more of multiple nodes depending on the nature of the transaction and the use cases. The TSDCB platform (606) may interact with at least one node including but not limited to, TSDCB node 0 (618) about TSDCB platform manager (322), a TSDCB node 1 (620) about TSDCB certificate authority (118), a TSDCB node 2 (622) about a regulatory authority (612), a TSDCB node 3 (624) about the TSDCB user device (326) associated with the user (102), a TSDCB node 4 (626) associated with a bank (614) and TSDCB node 5 (628) associated with a merchant POS device (616).

In an aspect, the TSDCB system (320) as described in earlier mentioned figures may also enable enhancing the security of fund transfer and/or avoiding the possibility of fraudulent incidents pertaining fund transfer, which may be extremely difficult or impossible to control in conventional systems. The TSDCB system may enable the execution of different smart contracts to process different types of requests. For example, for the fraud use-case of collection requests recorded for a conventional transaction system, an additional level of the check may be implemented such as executing a smart contract to detect such a request and having an additional interaction with the paying user to alert the user over a user interface (UI) on a user device to confirm the fund transfer. In an exemplary embodiment, if the fund transfer may be and it may be concluded that the request is not fraudulent, then the digital signature of the user (based on the private key associated with the user's TSDCB account) can be used to include the user's endorsement of the transaction. In another exemplary embodiment, if the payment is not confirmed, then a fraud alert can be triggered and the traceable TSDCB Identity associated with the public key about the TSDCB account of the intended recipient can be utilized to identify the fraudster. In an exemplary embodiment, additional checks can be performed during processing that would require an OTP to be submitted in conjunction with a digital signature associated with the TSDCB account to confirm the submission of an OTP from the device, rather than a mere entry of the OTP in the receiving web portal. By limiting the number of public keys that can be associated with a single TSDCB account, the possibility to commit fraud can be drastically reduced in the country. Thus, by utilizing a blockchain platform with traceable user accounts, a secure fund transfer or exchange mechanism can be implemented to increase trust in the fund transfer techniques.

Figure 6C:
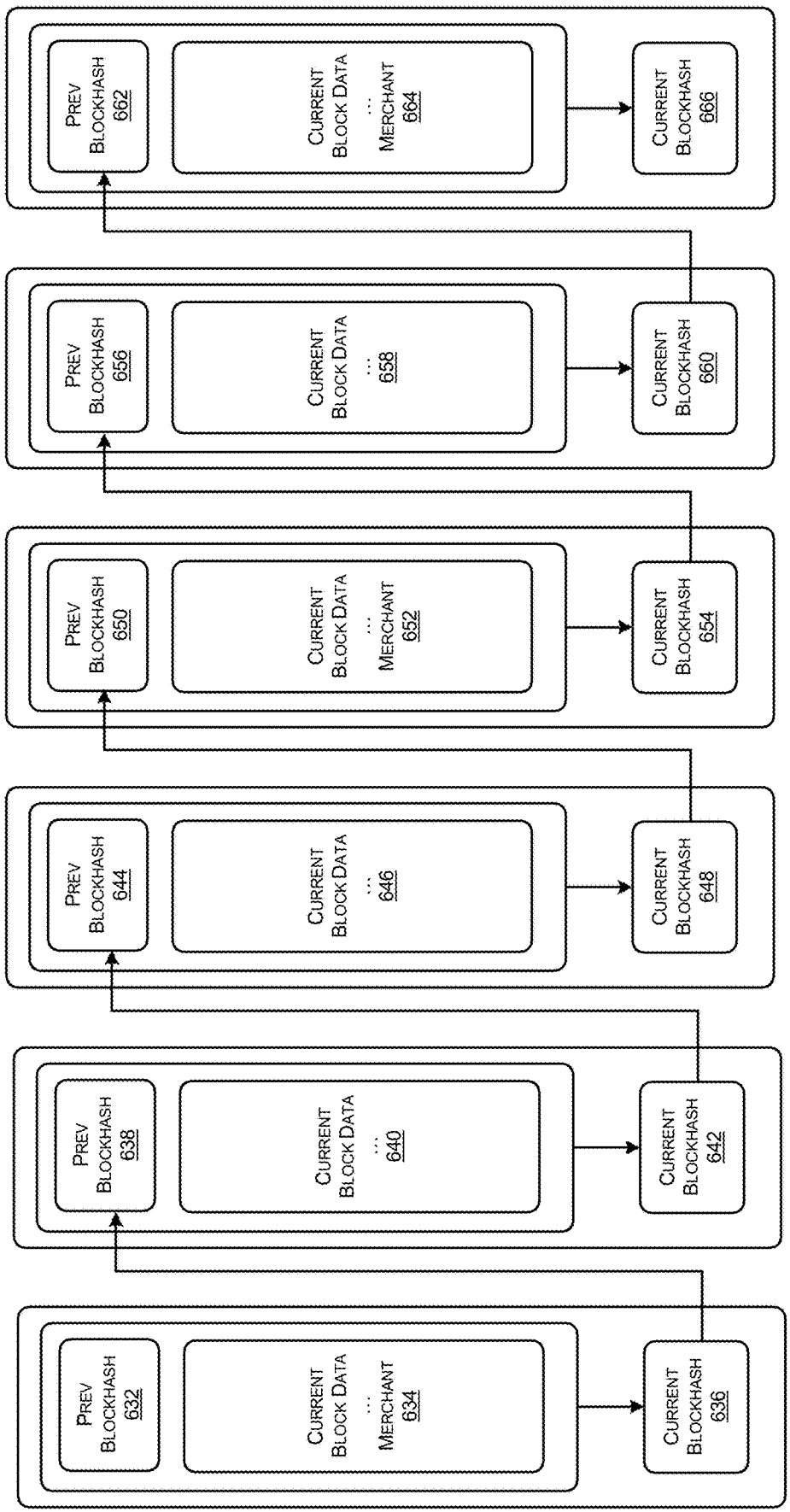
FIG. 6C illustrates an exemplary block diagram representation of hash chain across transaction blocks in a blockchain network, in accordance with embodiments of the present disclosure.

In an embodiment, as fund transfers are recorded on the TSDCB blockchain platform (606), a hash chain across transaction blocks in the blockchain network (112) may be created as shown in an overview of an exemplary representation in FIG. 6C, in accordance with an embodiment of the present disclosure. The overview in FIG. 6C depicts a hash chain of blocks, wherein each block may include a group of fund transfers that constitute the block, such that a current block hash is propagated into the subsequent block to create a tamper-resistant hash chain. The hash chain may include current block hash that may be represented as 636, 642, 648, 654, 660, and 666 that may correspond to current block data 634, 640, 646, 652, 658, and 664 respectively and may include a previous block hash 632, 638, 644, 650, 656 and 662 respectively. In the simplistic case, one block could contain exactly one transaction. In an embodiment, transaction blocks can be created based on a configurable number of fund transfers that constitute a block, or a configurable time duration to create the block. As illustrated in FIG. 6C, the blocks of transactions depicted in FIG. 6C may include transactions across different users, or between users and merchants in the TSDCB system (320) or any such examples.

In an embodiment, a user such as a merchant may be interested only in a trusted hash chain related to transactions that it was associated with. To accomplish this, a hash chain across transaction blocks may be created for which a specific participated merchant may be included in the blockchain. In an embodiment, a personalized blockchain ledger could be created for a specific user or a group of users or a merchant or a group of merchants, or a group of users and merchants.

Figure 6D:
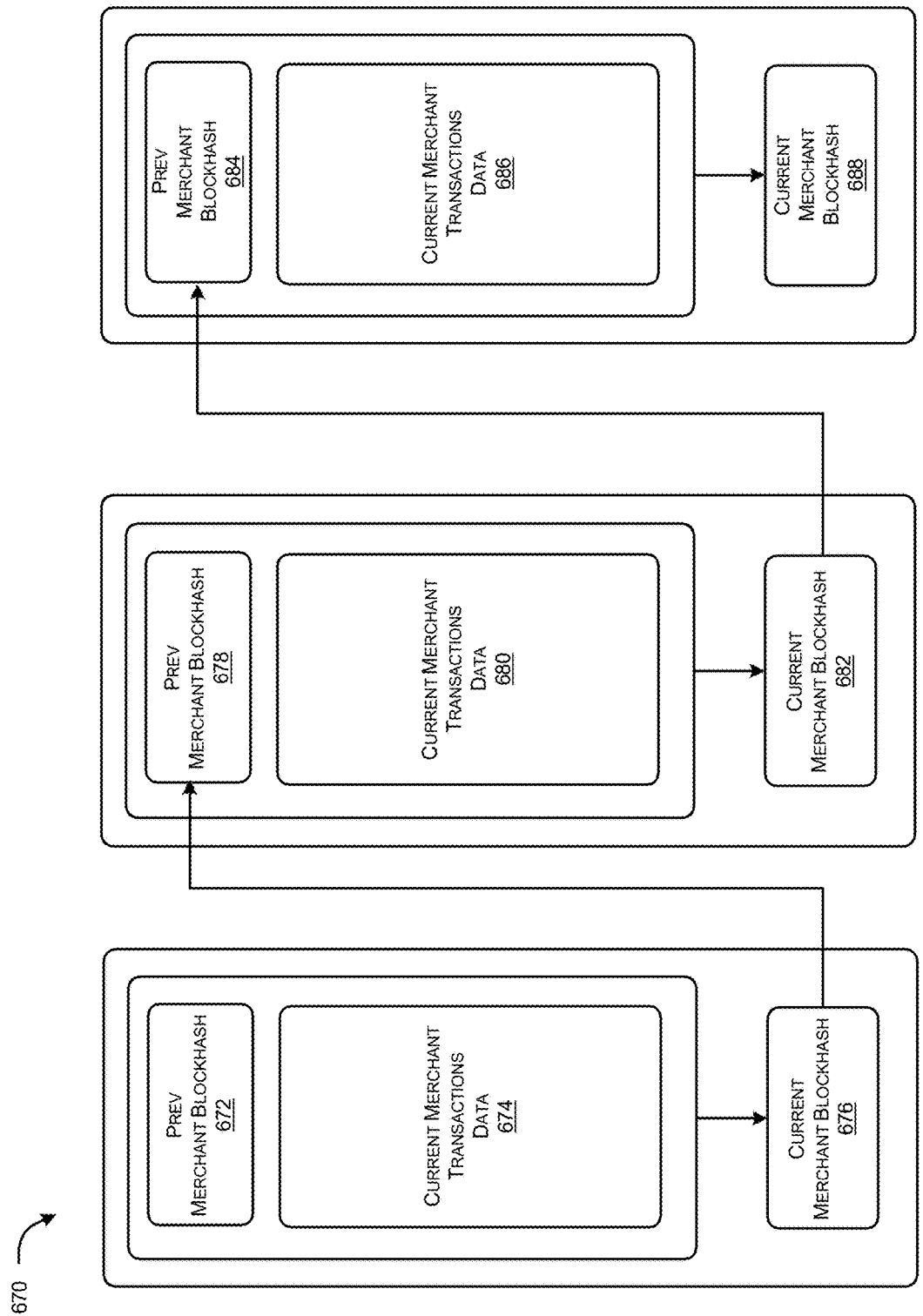
FIG. 6D illustrates an exemplary block diagram representation of personalized hash chain across fund transfer blocks corresponding to a particular participating merchant, in accordance with an embodiment of the present disclosure.

FIG. 6D illustrates an exemplary block diagram representation of a personalized hash chain across fund transfer blocks corresponding to a particular participating merchant, in accordance with an embodiment of the present disclosure. As shown in FIG. 6D, a block hash created across transactions may indicate the specific participating merchant. The hash chain may include current block hash that may be represented as 676, 682, and 688 that may correspond to current block data 674, 680, and 686 respectively about fund transfer specific to the merchant and may also include a previous block hash 672, 678, 684 respectively. In an embodiment, on a global blockchain ledger, the data may be stored in an encrypted manner, whereas the personalized ledgers may have data stored unencrypted. Alternatively, the data in personalized ledgers may be stored in an encrypted manner where the encryption key may be associated with the specific user or merchant or group of users and/or merchants. Such personalized ledgers may be dynamically created from a global blockchain ledger by the TSDCB platform if desired and distributed across a subset of participants (users and/or merchants) that need such information that is derived and shared from the global blockchain ledger, or from a blockchain ledger that is created for a larger group of users and/or merchants. The personalized hash chains may enhance the trust of the user and also facilitate sharing the personalized hash chains with the merchant to create a personalized distributed shared ledger between the TSDCB system (320), and the specific merchant. Such a personalized distributed ledger can also help address privacy concerns related to unnecessary sharing of all information across users and merchants that is recorded on the common TSDCB ledger. It will also help in managing provenance and trust better for specific participants and/or merchants in the TSDCB system (320) if desired. Various other exemplary embodiments may be possible. In an embodiment, the TSDCB system (320) may facilitate joining or integration as a participant node in an alternate global currency blockchain network.

Figure 6E:
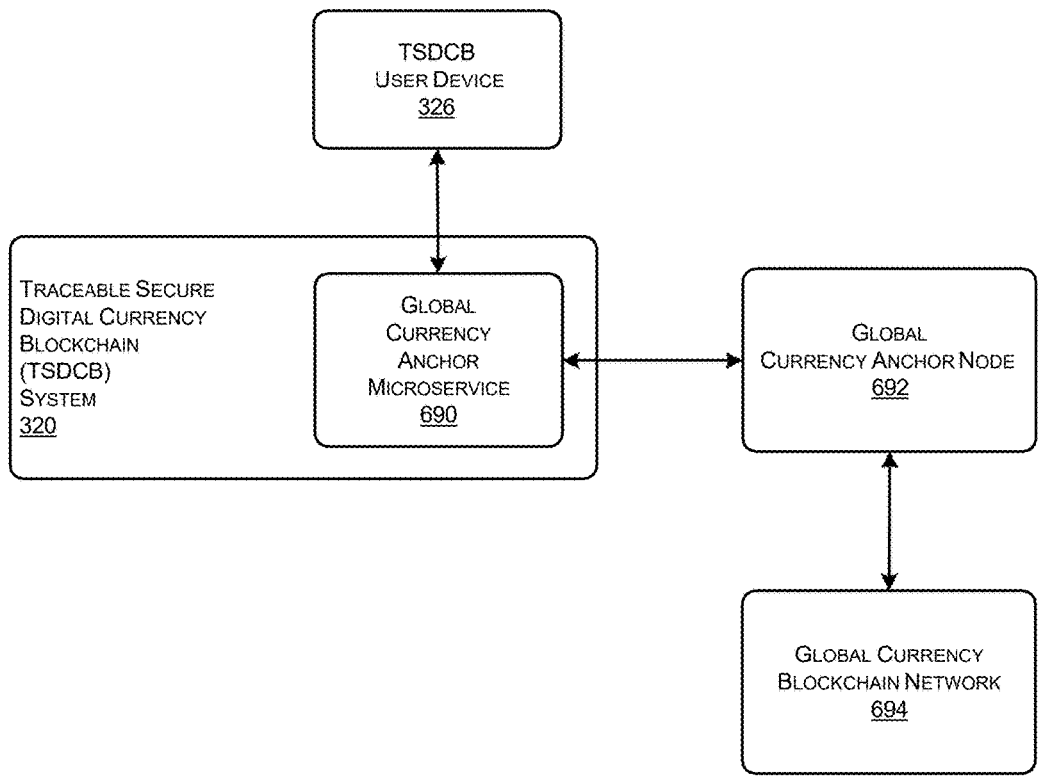
FIG. 6E illustrates an exemplary flow diagram representation of interaction of TSDCB system with global currency blockchain network, in accordance with an embodiment of the present disclosure.

FIG. 6E illustrates an exemplary flow diagram representation of interaction of the TSDCB system with the global currency blockchain network, in accordance with an embodiment of the present disclosure. The TSDCB system (320) can provide support to interact with a global currency anchor node (692) associated with the global currency blockchain network (694). The TSDCB system (320) may interact with TSDCB User Device (326) to maintain a balance in global currency accessed using a global currency anchor microservice (690) that may enable support for interaction with the global currency blockchain network (694). In an embodiment, TSDCB users can then choose to maintain a balance in the chosen global currency if desired subject to the fluctuations in a global currency. The TSDCB users may use the proposed mechanism of FIG. 6E as an investment vehicle to maintain their financial balances using a global "stable" currency to hedge against inflation in a fiat current or a virtual currency, which may be available for monitoring by regulatory authorities. Alternatively, it is possible that such a currency conversion may be only enabled when the TSDCB user travels across geographical boundaries where a specific fiat or virtual currency is not usable, and hence conversion is necessary during foreign travel. In an embodiment, an unused fund amount can be converted back to the TSDCB account of the user when the travel is concluded, without any need for monitoring by any regulatory authorities. The TSDCB system (320) of the present may thus enable interoperability and may act as a geographical anchor in different countries for global digital currency fund transfer. Various other exemplary embodiments may be possible. In an embodiment, the TSDCB system (320) may enable fund transfer between entities in virtual worlds.

Figure 6F:
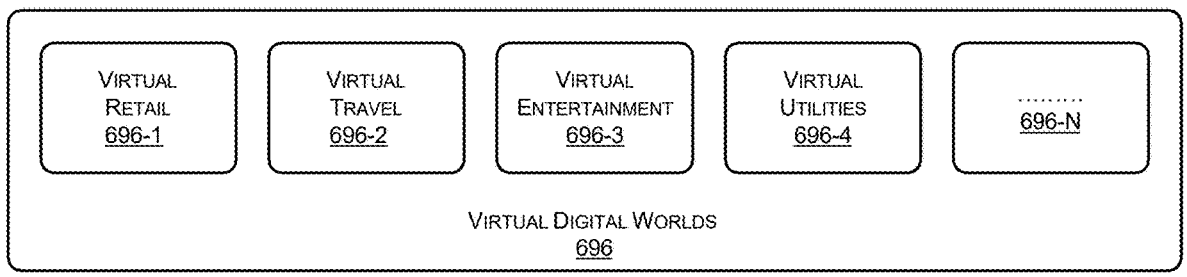
FIG. 6F illustrates an exemplary block diagram representation of various virtual digital worlds and fund transfer between entities in the virtual worlds, in accordance with an embodiment of the present disclosure.

FIG. 6F illustrates an exemplary block diagram representation of the various virtual digital world (696) and fund transfer between entities in the virtual worlds, in accordance with an embodiment of the present disclosure. Once the TSDCB system (320) is enabled, the TSDCB user may be enabled to interact or communicate with different entities for fund transfer such as including, but not limited to, Virtual Retail (696-1), or Virtual Travel (696-1), Virtual Entertainment (696-3), Virtual Utilities (696-4) and other virtual service providing entities (696-N). The participating entities may also manage their fund transfers for example, for supply-chain goods flow in the TSDCB system (320).

Figure 6G:
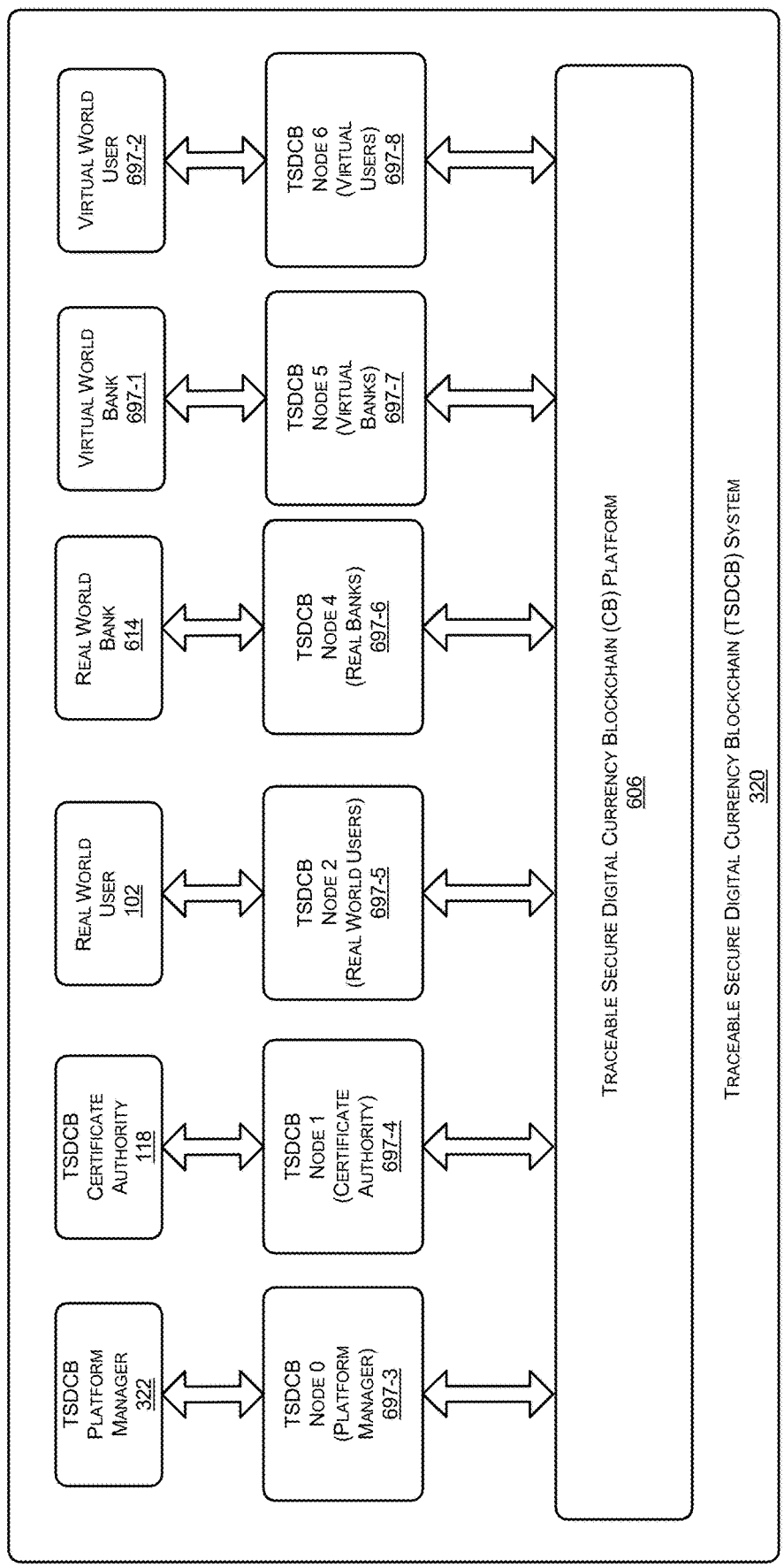
FIG. 6G illustrates an exemplary block diagram representation of Interaction between real and virtual world entities on the TSDCB platform, in accordance with an embodiment of the present disclosure.

FIG. 6G illustrates an exemplary block diagram representation of the interaction between real and virtual world entities on the TSDCB platform (606), in accordance with an embodiment of the present disclosure. In an embodiment, the TSDCB system (320) may enable fund transfer between entities in a real-world and a virtual world. As illustrated in FIG. 6G, the TSDCB system (320) may include the Traceable Secure Digital Currency Blockchain (TSDCB) platform (606), which may associate with multiple nodes related to the various parties/authorities such as users, merchants, financial organizations such as banks and other such entities. The TSDCB platform (606) may interact with one more of multiple nodes depending on the nature of the transaction and the use cases in a combination of the real-world and virtual world. The TSDCB platform (606) may interact with at least one node including but not limited to, TSDCB node 0 (697-3) about TSDCB platform manager (322), a TSDCB node 1 (607-4) about TSDCB certificate authority (118), a TSDCB node 2 (697-5) about a real-world user (102), a TSDCB node 4 (697-6) associated with a real-world bank (614), a TSDCB node 5 (697-7) associated with a virtual world bank (697-1) and a TSDCB node 6 (697-8) associated with a virtual world user (697-2). Various other nodes or entities/parties/authorities may be included. In an embodiment, when needed, the TSDCB system may be converted to enable fund transfer in traditional fiat USD (US Dollars) or traditional fiat INR (Indian Rupees) or alternative currencies as needed with the entities in the real and virtual worlds (such as the user identities in the real and virtual worlds, banks in the real and virtual worlds.) interacting with each other on the TSDCB platform (606) as shown in FIG. 6G. The transactions between such participating entities may be recorded on a shared blockchain/DLT ledger associated with these participating entities. Various other exemplary embodiments may be possible. In an embodiment, the TSDCB system may enable fund transfer between entities in a virtual reality environment to enable users to interact in virtual digital words participating using their corresponding avatar in such a virtual digital world, that may enable fund transfer with digital currency.

Figure 6H:
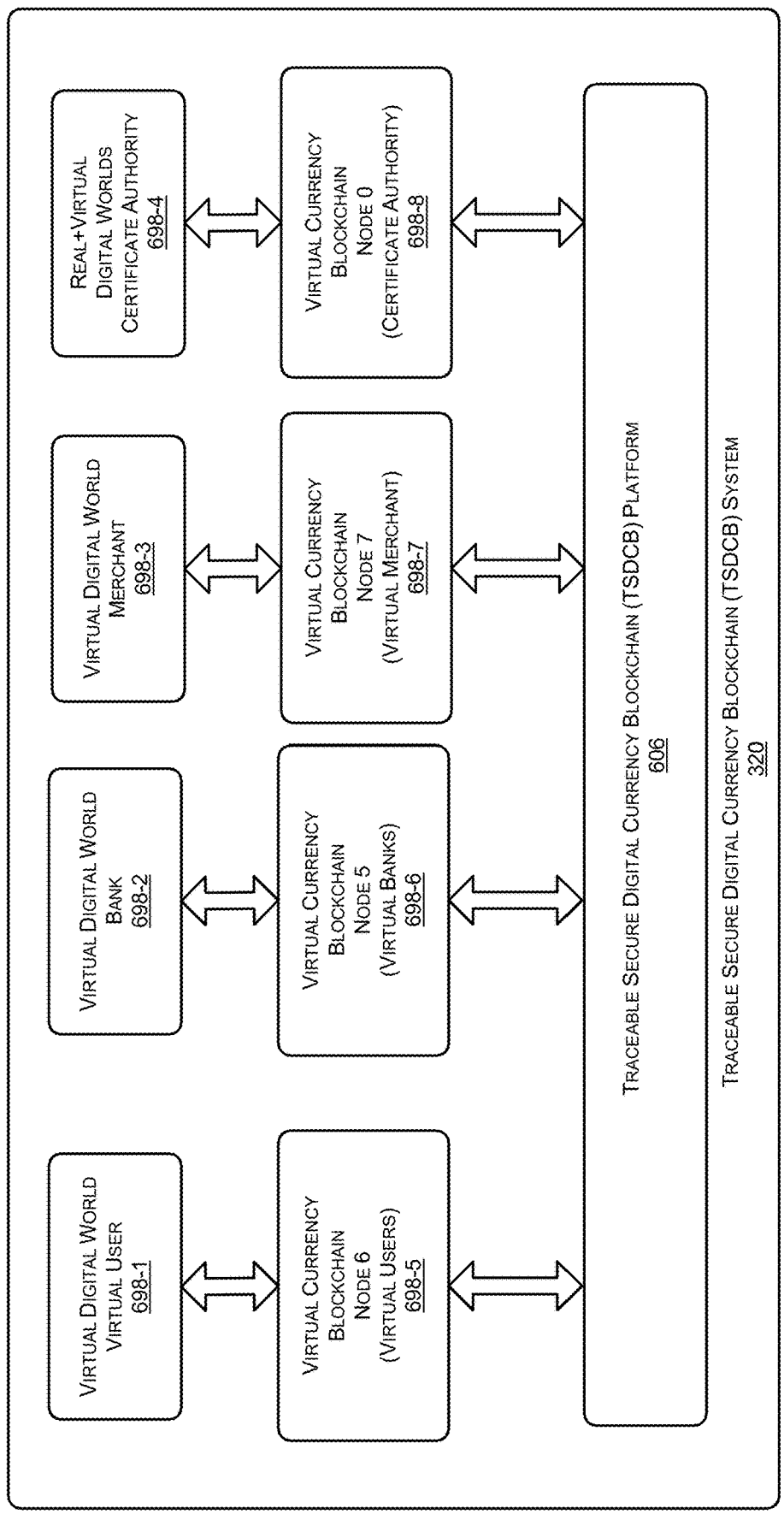
FIG. 6H illustrates an exemplary block diagram representation of Interaction between virtual world entities on the TSDCB platform, in accordance with an embodiment of the present disclosure.

FIG. 6H illustrates an exemplary block diagram representation of Interaction between virtual world entities on the TSDCB platform (606), in accordance with an embodiment of the present disclosure. The transactions between the participating entities such as a virtual user, a virtual bank, and a virtual merchant can be recorded on a shared blockchain/DLT ledger associated with these participating entities. As illustrated in FIG. 6H, the TSDCB system (320) may include a Traceable Secure Digital Currency Blockchain (TSDCB) platform (606), which may associate with multiple nodes related to the various parties/authorities such as users, merchants, financial organizations such as banks, and other such entities. The TSDCB platform (606) may interact with one more of multiple nodes depending on the nature of the transaction and the use cases in a virtual reality environment wherein an avatar of a user may perform a fund transfer using the TSDCB system (320). The TSDCB platform (606) may interact with at least one node including but not limited to, TSDCB node 6 (698-5) about virtual digital world virtual user (698-1), a TSDCB node 5 (698-6) about virtual digital world bank (698-2), a TSDCB node 7 (698-7) about a virtual digital world merchant (698-3) and a TSDCB node 0 (698-8) associated with a real and virtual digital worlds certificate authority (698-4). Various other nodes or entities/parties/authorities may be included.

In an embodiment, an additional feature that may be made feasible on the TSDCB system (320) is to enable a digital financial ecosystem with full traceability of every issued currency in the system. For example, in cases involving small amounts below a currency management threshold (such as INR 1000) one could merely utilize an account-based model as described above to manage fund transfer between individuals or transacting entities, to keep the financial transaction processing simple. However, for large amounts (such as for example greater than or equal to Rs 1000 for example), one can have a tracking number associated with each issued large digital currency "paper"/"notes". The system can have different denominations of currency notes issued such as INR 1000, INR 2000, INR 5000, INR 1000, INR 2000, INR 50000, INR 100000, INR 200000, INR 500000, and so on. It may be appreciated that the present disclosure may not be limited by the mentioned embodiments and/or examples and several different embodiments may be realized by the implementation of the system and method of the present disclosure. In an embodiment, when large amounts may be exchanged, the fund transfer may be tracked for large currency denominations between individuals or entities. In this case, the private key associated with the owner of a current set of digital currency notes may be used to reassign the notes to the public key of the new owner of these digital currency notes, when the fund transfer is complete. In an embodiment, any residual amount in the fund transfer that may be below the currency management threshold (such as for example for a remaining amount below Rs 1000) could just be managed using the traditional account-based model where an actual currency "note" is not tracked, and only the amount is tracked. The embodiments of the present disclosure may also benefit financial regulatory authorities as a hybrid approach of an account-based model for small amounts coupled with traceable currency for larger denominations may be explored, thereby leading to better transparency, trust, and accountability for fund transfers.

Figure 6I:
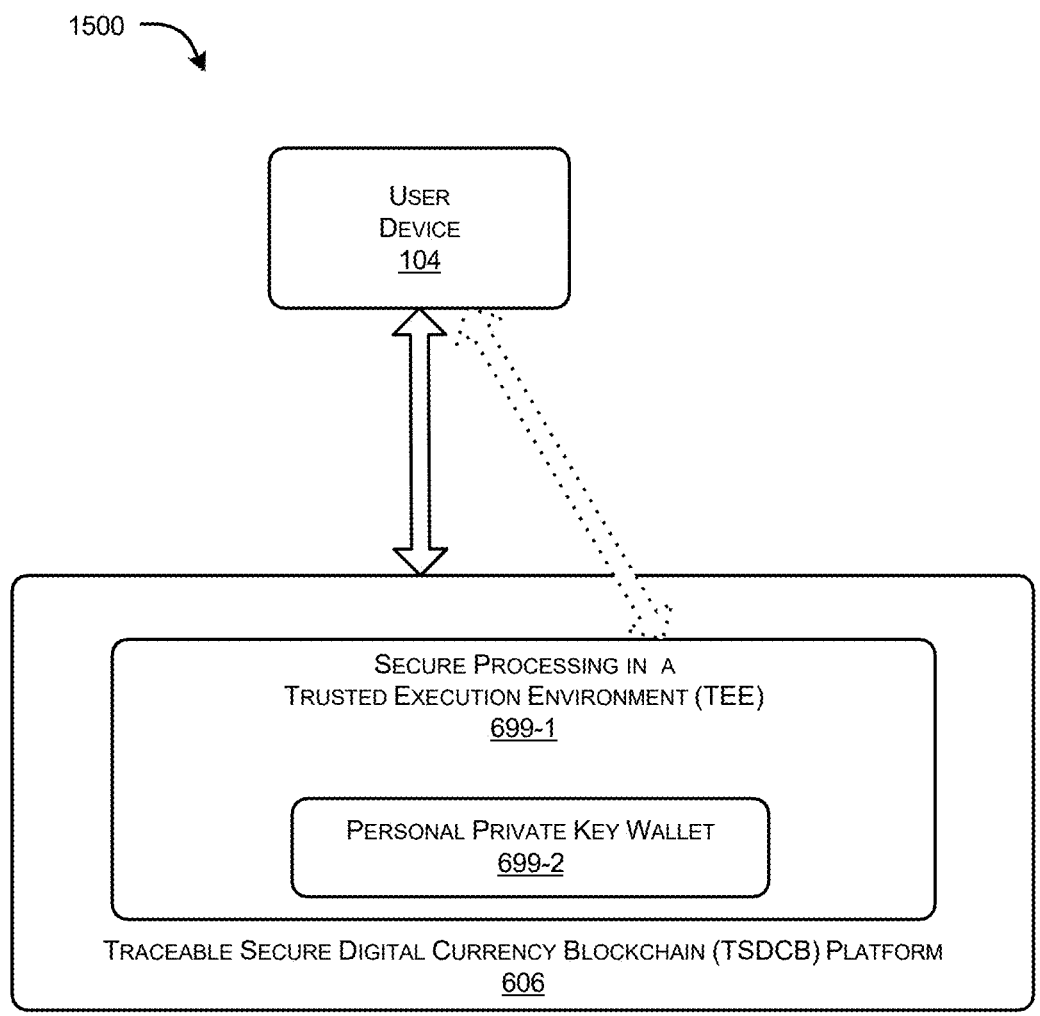
FIG. 6I illustrates an exemplary block diagram representation of Personal Private Key Wallet and Secure Processing Service, in accordance with an embodiment of the present disclosure.

FIG. 6I illustrates an exemplary block diagram representation of Personal Private Key Wallet and Secure Processing Service, in accordance with an embodiment of the present disclosure. The secure storage of private keys and the secure processing can be performed in a Trusted Execution Environment (TEE) (699-1) (such as in an Intel® SGX enclave or an ARM® Trustzone or similar secure environments) on the TSDCB platform (606) to allow the signed fund transfer for further processing in the TSDCB system (320). The public-key/private-key pair can be generated in the TEE (699-1) and stored in the TEE (699-1) securely. In an embodiment, in cryptocurrency-based systems, the user's private key remains on the user device (104) and it is never exposed, but in case certain user devices cannot generate their public-key/private-key pairs, or even store such a private key securely on their device, the TSDCB system (320) can provide the option to store the private key (along with the associated public key in the key pair) on the TSDCB platform (606) itself. Alternatively, if the user may not desire to lose the private key, then such a private key wallet service may be helpful to be used only under dire circumstances. In that case, the user device may utilize the TSDCB platform (606) to create a final fund transfer by signing with the private key for submission to the platform, with the private key-based processing managed securely on the TSDCB database. By providing a secure private key wallet (699-2) based service, the TSDCB platform (606) ensures that the keys are stored safely in the TSDCB. Only authorized users may have access to such a private key wallet. In an embodiment, a user may be required to authenticate herself/himself with multiple-factor authentication including a login/password, an OTP, and possibly a manual verification as well if needed to minimize the need to access such a private key wallet only if needed (for example when the user-device is lost). In other cases, where the user device has limited processing or secure storage capabilities, such a capability can be very relevant.

Figure 7:
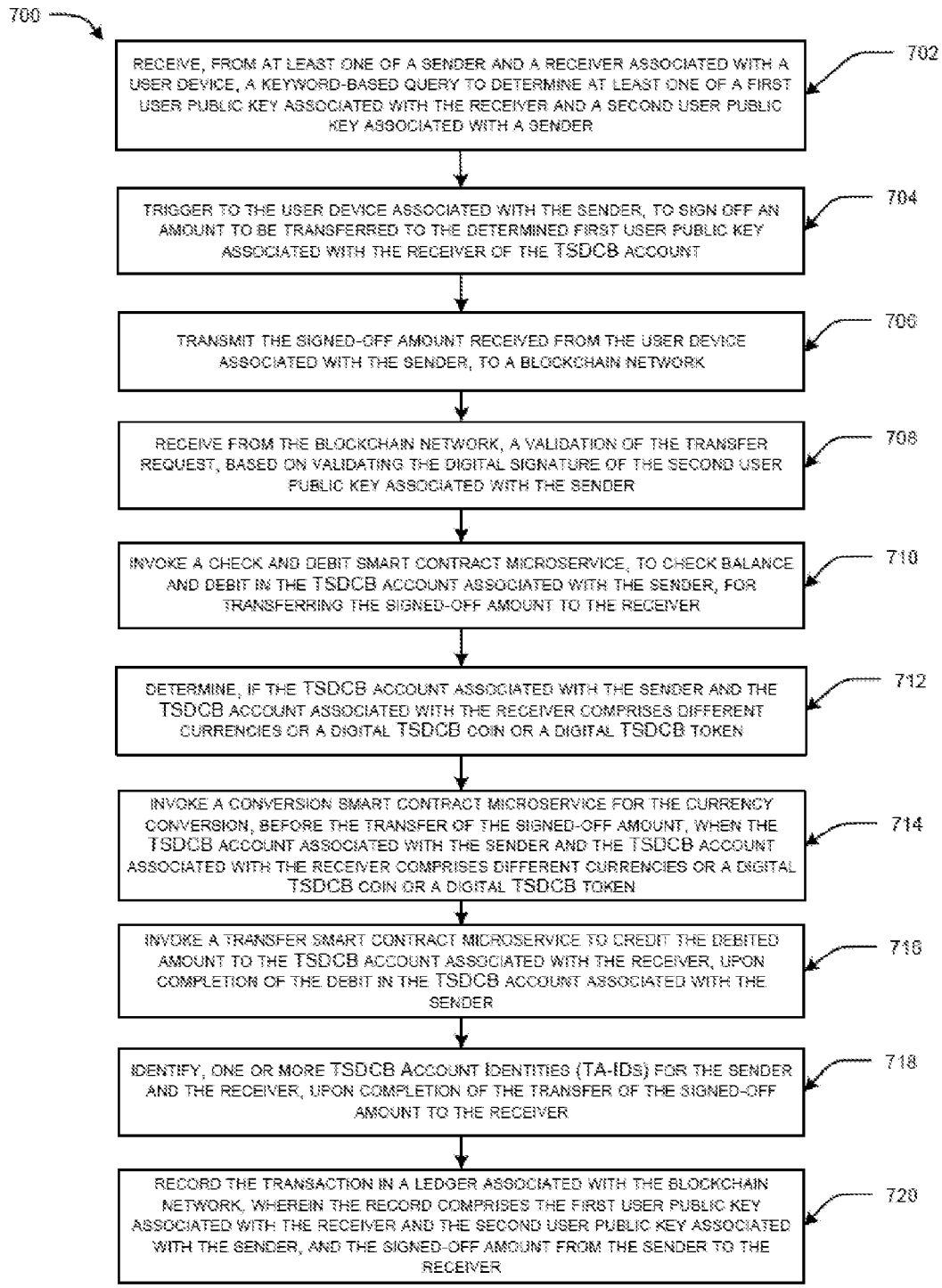
FIG. 7 illustrates an exemplary method flow chart depicting a method for secure and traceable fund transfer operation through a distributed ledger, in accordance with an embodiment of the present disclosure.

FIG. 7 illustrates an exemplary method flow chart depicting a method (700) for secure and traceable fund transfer operation through a distributed ledger, in accordance with an embodiment of the present disclosure.

As illustrated in FIG. 7, the method (700) includes one or more blocks illustrating a method of secure and traceable fund transfer operation through a distributed ledger. The method (700) may be described in the general context of computer-executable instructions. Generally, computer-executable instructions can include routines, programs, objects, components, data structures, procedures, modules, and functions, which perform functions or implement abstract data types.

The order in which the method (700) is described is not intended to be construed as a limitation, and any number of the described method blocks can be combined in any order to implement the method (700). Additionally, individual blocks may be deleted from the methods without departing from the scope of the subject matter described herein. Furthermore, the method (700) can be implemented in any suitable hardware, software, firmware, or combination thereof.

At block (702), the method (700) may include receiving, by the processor (202) associated with the system (110), from at least one of a sender and a receiver associated with a user device (104), a keyword-based query to determine at least one of a first user public key associated with the receiver and a second user public key associated with a sender. At least one of the sender and the receiver is associated with a Traceable Secure Digital Currency Blockchain (TSDCB) account.

At block (704), the method (700) may include triggering, by the processor (202), to the user device (104) associated with the sender, to sign off an amount to be transferred to the determined first user public key associated with the receiver of the TSDCB account. The sign-off is performed by the sender using a private key corresponding to the TSDCB account associated with the sender.

At block (706), the method (700) may include transmitting, by the processor (202), the signed-off amount received from the user device (104) associated with the sender, to a blockchain network (112). The signed-off amount is received via a fund transfer request to the associated TSDCB account with a digital signature attached to a transaction.

At block (708), the method (700) may include receiving, by the processor (202), from the blockchain network (112), a validation of the transfer request, based on validating the digital signature of the second user public key associated with the sender.

At block (710), the method (700) may include invoking, by the processor (202), a check and debit smart contract microservice, to check balance and debit in the TSDCB account associated with the sender, for transferring the signed-off amount to the receiver.

At block (712), the method (700) may include determining, by the processor (202), if the TSDCB account associated with the sender and the TSDCB account associated with the receiver comprises different currencies or a digital TSDCB coin or a digital TSDCB token.

At block (714), the method (700) may include invoking, by the processor (202), a conversion smart contract microservice for the currency conversion, before the transfer of the signed-off amount, when the TSDCB account associated with the sender and the TSDCB account associated with the receiver comprises different currencies or a digital TSDCB coin or a digital TSDCB token.

At block (716), the method (700) may include invoking, by the processor (202), a transfer smart contract microservice to credit the debited amount to the TSDCB account associated with the receiver, upon completion of the debit in the TSDCB account associated with the sender.

At block (718), the method (700) may include identifying, by the processor (202), one or more TSDCB Account Identities (TA-IDs) for the sender and the receiver, upon completion of the transfer of the signed-off amount to the receiver.

At block (720), the method (700) may include recording, by the processor (202), the transaction in a ledger associated with the blockchain network (112). The record comprises the first user public key associated with the receiver and the second user public key associated with the sender, and the signed-off amount from the sender to the receiver.

Figure 8:
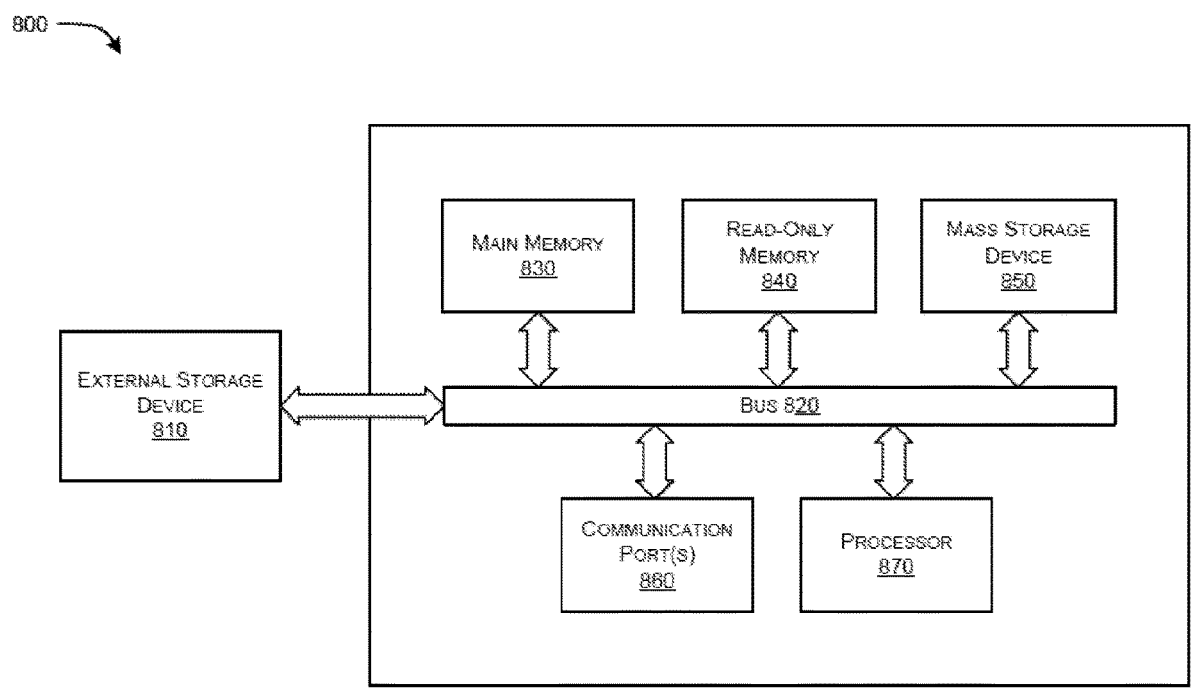
FIG. 8 illustrates an exemplary computer system in which or with which embodiments of the present invention can be utilized, in accordance with embodiments of the present disclosure.

FIG. 8 illustrates an exemplary computer system (800) in which or with which embodiments of the present invention can be utilized, in accordance with embodiments of the present disclosure.

As shown in FIG. 8, the computer system (800) can include an external storage device (810), a bus (820), a main memory (830), a read-only memory (840), a mass storage device (850), communication port (860), and a processor (870). A person skilled in the art will appreciate that the computer system may include more than one processor and communication ports. Examples of processor (870) include, but are not limited to, an Intel® Itanium® or Itanium 2 processor(s), or AMD® Opteron® or Athlon MP® processor(s), Motorola® lines of processors, FortiSOC™ system on chip processors or other future processors. Processor (870) may include various modules associated with embodiments of the present invention. Communication port (860) can be any of an RS-232 port for use with a modem-based dialup connection, a 10/100 Ethernet port, a Gigabit, or 10 Gigabit port using copper or fiber, a serial port, a parallel port, or other existing or future ports. Communication port (860) may be chosen depending on a network, such as a Local Area Network (LAN), Wide Area Network (WAN), or any network to which the computer system connects. Memory (830) can be Random Access Memory (RAM), or any other dynamic storage device commonly known in the art. Read-only memory (840) can be any static storage device(s) e.g., but not limited to, a Programmable Read-Only Memory (PROM) chips for storing static information e.g., start-up or BIOS instructions for the processor (870). Mass storage (850) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar 13K800), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus (820) communicatively couples' processor(s) (870) with the other memory, storage, and communication blocks. Bus (820) can be, e.g., a Peripheral Component Interconnect (PCI)/PCI Extended (PCI-X) bus, Small Computer System Interface (SCSI), USB or the like, for connecting expansion cards, drives, and other subsystems as well as other buses, such a front side bus (FSB), which connects processor (870) to a software system.

Optionally, operator and administrative interfaces, e.g., a display, keyboard, and a cursor control device, may also be coupled to the bus (820) to support direct operator interaction with a computer system. Other operator and administrative interfaces can be provided through network connections connected through a communication port (860). The external storage device (810) can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

Various embodiments of the present disclosure provide a system and a method for secure and traceable fund transfer operation through a distributed ledger. Embodiments herein-enable an interchange between various types of currencies and facilitate scalability for global operations. Embodiments herein also facilitate better transparency of fund transfer so that audit or monitoring bodies can trace the fund transfer operations to prevent illicit operations. Embodiments herein provide flexibility to support a variety of currencies such as digital currencies, virtual currencies, global currencies, virtual tokens or digital tokens, and other such currencies. Embodiments herein support primary and secondary devices for fund transfers. Embodiments herein enable to create smart contract microservice service chains, and optimized smart contract microservice service chains that avoid the need for large distributed ledger networks and enables good scalability, wherein microservices anchors may be provided for interacting with external currencies. Embodiments herein ensure personalized blockchain ledger support for specific entities such as merchants. Embodiments herein enable monitoring and personalized blockchain ledger support for regulatory, audit, tax authorities, and other such parties. Embodiments herein enable fund transfer between real-world entities, real and virtual world entities, and between virtual world entities. Embodiments herein enable a hybrid currency system with traceable large currency notes in a digital form. Embodiments herein support personal private key walletsand secure processing services. Embodiments herein also enable the adoption of digital currencies that currently may not be used due to lack of support for tracing the transactions.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as a limitation.

We claim:
1. A system (110) for secure and traceable fund transfer operation through a distributed ledger, the system (110) comprising:
a processor (202);
a user device (104) communicatively coupled to the processor (202);

a Traceable Secure Digital Currency Blockchain (TSDCB) identification server (116) communicatively coupled to the processor (202); and a TSDCB-Certificate authority (118) communicatively coupled to the processor (202);

a memory (204) coupled to the processor (202), wherein the memory (204) comprises processor-executable instructions, which on execution, causes the processor (202) to:

receive, from at least one of a sender and a receiver associated with the user device (104), a keyword-based query to determine at least one of a first user public key associated with the receiver and a second user public key associated with the sender, wherein the at least one of the sender and the receiver is associated with a Traceable Secure Digital Currency Blockchain (TSDCB) account, wherein the TSDCB account is established via an identity verification process performed by the TSDCB identification server (116) and certified by the TSDCB-Certificate authority (118) to associate a user's verified identity with a unique Traceable Identity Number (TIN);

trigger to the user device (104) associated with the sender, to sign off an amount to be transferred to the first user public key associated with the receiver of the TSDCB account, wherein the sign off is performed by the sender using a private key corresponding to the TSDCB account associated with the sender;

transmit the signed-off amount received from the user device (104) associated with the sender, to a blockchain network (112), wherein the signed-off amount is received via a fund transfer request to the associated TSDCB account with a digital signature of the sender attached to a transaction;

receive from the blockchain network (112), a validation of the transfer request, based on validating the digital signature of the sender with the second user public key associated with the sender;

invoke a check and debit smart contract microservice, to check balance and debit in the TSDCB account associated with the sender, for transferring the signed-off amount to the receiver;

determine, that the TSDCB account associated with the sender and the TSDCB account associated with the receiver comprises different currencies or a digital TSDCB coin or a digital TSDCB token;

invoke a conversion smart contract microservice for the currency conversion, before the transfer of the signed-off amount, based on determining that the TSDCB account associated with the sender and the TSDCB account associated with the receiver comprises different currencies or a digital TSDCB coin or a digital TSDCB token;

invoke a transfer smart contract microservice for the transfer of the signed-off amount to credit a debited amount to the TSDCB account associated with the receiver, and to debit the debited amount from the TSDCB account associated with the sender, wherein execution of the transfer smart contract microservice is permitted upon successful verification of the TIN and binding of the TIN to a public key generated on the user device (104);

identify, one or more TSDCB Account Identities (TA-IDs) for the sender and the receiver, in response to invoking the transfer smart contract microservice for the transfer of the signed-off amount to the receiver; and record the transaction in a ledger associated with the blockchain network (112), wherein the record comprises the first user public key associated with the receiver and the second user public key associated with the sender, and the signed-off amount from the sender to the receiver.

2. The system (110) as claimed in claim 1, wherein the processor (202) is further configured to:

invoke a monitor smart contract microservice to monitor for warning triggers comprising at least one of a financial transaction exceeding a certain amount, and a set of transactions within a short time window exceeding a certain amount.

3. The system (110) as claimed in claim 1, wherein the one or more TSDCB Account Identities (TA-IDs) for the sender and the receiver is generated, and wherein for the generation of the TA-IDs, the processor (202) is further configured to:

receive from the user device (104) a generated the first user public key, the second user public key, and the private key;

trigger a secure application on the user device (104) to interact with the TSDCB identification server (116) for generating a TSDCB Identity Number (TIN), wherein a public-private key pair is generated in the user device (104) concurrently with or after obtaining the TIN from TSDCB identification server (116); and receive from the TSDCB identification server (116), a generated TIN with a digital signature of the TSDCB identification server (116).

4. The system (110) as claimed in claim 1, wherein the TSDCB account associated with the sender and the TSDCB account associated with the receiver are created using the blockchain network (112), wherein for the creation of the TSDCB account, the processor (202) is configured to:

receive a request from the user device (104) to create a TSDCB account and a TSDCB Account ID (TA-ID), wherein the request comprises TIN with a public key to set up the TSDCB Account ID (TA-ID) for a user;

trigger a request to the user device (104), for authentication of the TIN, wherein the user device (104) transmits identification information in an encrypted form to the system (110), wherein the user device (104) encrypts the identification information using a public key of the TSDCB identification server (116) along with a digital signature signed by the private key;

verify the digital signature using the public key of the user device (104), and then submit the encrypted identification information message to the TSDCB identification server (116), wherein the TSDCB identification server (116) verifies a biometric identification as belonging to the TIN and returns a success/failure notification to the system (110) along with a digital signature attested;

provide to the TSDCB-Certificate authority (118) (TSDCB-CA), the generated public key with the TIN generated by the user device (104) to bind the public key to the TIN, wherein the TSDCB-CA generates a certificate for the user device (104) based on a public-key from the user device (104), signs the certificate; and create the TSDCB Account ID (TA-ID) for the user of the user device (104) by recording the TIN, the public key, and the certificate for the user.

5. The system (110) as claimed in claim 1, wherein the keyword-based query comprises at least one of a name, a type of currency or token, a mobile number, and a Traceable secure digital currency blockchain Identity Number (TIN).

6. The system (110) as claimed in claim 1, wherein the currencies comprise at least one of traditional currencies, digital currencies, virtual currencies, and global currencies.

7. The system (110) as claimed in claim 1, wherein recording the transaction in the ledger associated with the blockchain network (112) comprises a TIN associated with the TSDCB account of the sender and the receiver, a TIN associated with the transactions, the TA-IDs, and public keys.

8. A method for secure and traceable fund transfer operation through a distributed ledger, the method comprising:
receiving, by a processor (202) associated with a system (110), from at least one of a sender and a receiver associated with a user device (104), a keyword-based query to determine at least one of a first user public key associated with the receiver and a second user public key associated with the sender, wherein the at least one of the sender and the receiver is associated with a Traceable Secure Digital Currency Blockchain (TSDCB) account, wherein the TSDCB account is established via an identity verification process performed by a TSDCB identification server (116) and certified by a TSDCB-Certificate authority (118) to associate a user's verified identity with a unique Traceable Identity Number (TIN);
triggering, by the processor (202), to the user device (104) associated with the sender, to sign off an amount to be transferred to the first user public key associated with the receiver of the TSDCB account, wherein the sign off is performed by the sender using a private key corresponding to the TSDCB account associated with the sender;
transmitting, by the processor (202), the signed-off amount received from the user device (104) associated with the sender, to a blockchain network (112), wherein the signed-off amount is received via a fund transfer request to the associated TSDCB account with a digital signature of the sender attached to a transaction;
receiving, by the processor (202), from the blockchain network (112), a validation of the transfer request, based on validating the digital signature of the sender with the second user public key associated with the sender;
invoking, by the processor (202), a check and debit smart contract microservice, to check balance and debit in the TSDCB account associated with the sender, for transferring the signed-off amount to the receiver;
determining, by the processor (202), that the TSDCB account associated with the sender and the TSDCB account associated with the receiver comprises different currencies or a digital TSDCB coin or a digital TSDCB token;
invoking, by the processor (202), a conversion smart contract microservice for the currency conversion, before the transfer of the signed-off amount, based on determining that the TSDCB account associated with the sender and the TSDCB account associated with the receiver comprises different currencies or a digital TSDCB coin or a digital TSDCB token;
invoking, by the processor (202), a transfer smart contract microservice for the transfer of the singed-off amount to credit a debited amount to the TSDCB account associated with the receiver, and to debit the debited amount from the TSDCB account associated with the sender, wherein execution of the transfer smart contract microservice is permitted upon successful verification of the TIN and binding of the TIN to a public key generated on the user device (104);
identifying, by the processor (202), one or more TSDCB Account Identities (TAIDs) for the sender and the receiver, in response to invoking the transfer smart contract microservice for the transfer of the signed-off amount to the receiver; and
recording, by the processor (202), the transaction in a ledger associated with the blockchain network (112), wherein the record comprises the first user public key associated with the receiver and the second user public key associated with the sender, and the signed-off amount from the sender to the receiver.

9. The method as claimed in claim 8, wherein the method further comprises:
invoking, by the processor (202), a monitor smart contract microservice to monitor for warning triggers comprising at least one of a financial transaction exceeding a certain amount, and a set of transactions within a short time window exceeding a certain amount.

10. The method as claimed in claim 8, wherein the one or more TSDCB Account Identities (TA-IDs) for the sender and the receiver is generated, and wherein generating the TA-IDs further comprises:
receiving, by the processor (202), from the user device (104) a generated the first user public key, the second user public key, and the private key;
triggering, by the processor (202), a secure application on the user device (104) to interact with the TSDCB identification server (116) for generating a TSDCB Identity Number (TIN), wherein a public-private key pair is generated in the user device (104) concurrently with or after obtaining the TIN from TSDCB identification server (116); and
receiving, by the processor (202), from the TSDCB identification server (116), a generated TIN with a digital signature of the TSDCB identification server (116).

11. The method as claimed in claim 8, wherein the TSDCB account associated with the sender and the TSDCB account associated with the receiver are created using the blockchain network (112), wherein the creation of the TSDCB account further comprises:
receiving, by the processor (202), a request from the user device (104) to create a TSDCB account and a TSDCB Account ID (TA-ID), wherein the request comprises TIN with a public key to set up the TSDCB Account ID (TA-ID) for a user;
triggering, by the processor (202), a request to the user device (104), for authentication of the TIN, wherein the user device (104) transmits identification information in an encrypted form to the system (110), wherein the user device (104) encrypts the identification information using a public key of the TSDCB identification server (116) along with a digital signature signed by the private key;
verifying, by the processor (202), the digital signature using the public key of the user device (104), and then submit the encrypted identification information message to the TSDCB identification server (116), wherein the TSDCB identification server (116) verifies a biometric identification as belonging to the TIN and returns a success/failure notification to the system (110) along with a digital signature attested;

providing, by the processor (202), to the TSDCB-Certificate authority (118) (TSDCB-CA), the generated public key with the TIN generated by the user device (104) to bind the public key to the TIN, wherein the TSDCB-CA generates a certificate for the user device (104) based on a public-key from the user device (104), signs the certificate; and creating, by the processor (202), the TSDCB Account ID (TA-ID) for the user of the user device (104) by recording the TIN, the public key, and the certificate for the user.

12. The method as claimed in claim 8, wherein the keyword-based query comprises at least one of a name, a type of currency or token, a mobile number, and a Traceable secure digital currency blockchain Identity Number (TIN).

13. The method as claimed in claim 8, wherein the currencies comprise at least one of traditional currencies, digital currencies, virtual currencies, and global currencies.

14. The method as claimed in claim 8, wherein recording the transaction in the ledger associated with the blockchain network (112) comprises a TIN associated with the TSDCB account of the sender and the receiver, a TIN associated with the transactions, the TA-IDs, and public keys.

\* \* \* \* \*